United States Patent
Shaw et al.

(10) Patent No.: US 6,311,211 B1
(45) Date of Patent: Oct. 30, 2001

(54) METHOD AND APPARATUS FOR DELIVERING ELECTRONIC ADVOCACY MESSAGES

(75) Inventors: David E. Shaw, New York, NY (US); Roger A. Stone, Bethesda, MD (US); David M. Sasson; Charles E. Ardai, both of New York, NY (US); V. S. Mani, Long Island City, NY (US); Yatin Saraiya, Summit, NJ (US)

(73) Assignee: Juno Online Services, Inc., New York, NY (US)

( * ) Notice: Subject to any disclaimer, the term of this patent is extended or adjusted under 35 U.S.C. 154(b) by 0 days.

(21) Appl. No.: 09/229,965

(22) Filed: Jan. 14, 1999

Related U.S. Application Data

(63) Continuation-in-part of application No. 09/153,145, filed on Sep. 14, 1998, now Pat. No. 6,199,106, which is a continuation-in-part of application No. 09/206,343, filed on Dec. 7, 1998, which is a continuation of application No. 08/636,739, filed on Apr. 19, 1996, now Pat. No. 5,809,242, which is a continuation of application No. 08/636,745, filed on Apr. 19, 1996, now Pat. No. 5,848,397.
(60) Provisional application No. 60/103,380, filed on Oct. 7, 1998.

(51) Int. Cl.[7] ..................................................... G06F 13/00
(52) U.S. Cl. ............................................................ 709/206
(58) Field of Search ................................. 705/7, 10, 12, 705/14, 26; 709/200, 206, 207, 217, 218, 219

(56) References Cited

U.S. PATENT DOCUMENTS

| | | | |
|---|---|---|---|
| 5,721,827 | * | 2/1998 | Logan et al. .......................... 709/217 |
| 5,740,549 | * | 4/1998 | Reilly et al. ............................ 705/14 |
| 5,809,242 | * | 9/1998 | Shaw et al. ........................... 709/217 |
| 5,838,790 | * | 11/1998 | McAuliffe et al. ...................... 380/4 |
| 5,848,397 | * | 12/1998 | Marsh et al. ........................... 705/14 |
| 5,950,173 | * | 9/1999 | Perkowshi .............................. 705/26 |
| 5,996,006 | * | 11/1999 | Speicher ................................ 709/218 |

OTHER PUBLICATIONS

Bonner, Jack, et al., "Trends in Grassroots Lobbying: Consultant Q&A," *Campaigns & Elections*, Feb. 1999, pp. 22–25.

Bush, Michael, "Nonprofit Sees Speedy Results Via Net —Juno Helps Parents' Rights Group Boost Response, Spread Message in Texas," *DM News*, Jul. 6, 1998, p. 22.

(List continued on next page.)

*Primary Examiner*—Robert B Harrell
(74) *Attorney, Agent, or Firm*—Kenyon & Kenyon

(57) ABSTRACT

A method of operating an advocacy network is provided. One or more users are selected based on information in a user database containing, for example, demographic or psychographic information about users as well as information identifying a representative associated with each user, such as a home address. An advocacy message is sent to a user through a first communication network, such as by sending an advocacy message associated with an e-mail message. The advocacy message may include a portion that lets the user generate an indication, such as by clicking on a portion of a computer screen. When an indication is received, a response message is sent to the representative associated with the user. The response message includes information about the user, such as the user's name and home address, and may be sent at a pre-determined time along with response messages from other users. The response message may be an e-mail message, a facsimile message, a printed letter or a telephone call. The user can also provide answers to survey questions and/or grant permission to have his or her contact information provided to an advocacy party.

63 Claims, 18 Drawing Sheets

Chandrasekaran, Rajiv, "Ensuring Congress Gets the Word: Net.Capitol Directs Political E–Mail," *Washington Post*, Jan. 5, 1998, p. F15.

Incongress™, "Charter Subscriber Offer," Brochure Information. No date.

Incongress™, "Frequently Asked Questions," Brochure Information. No date.

Incongress™, "Wired—Congress is. Now, You Can Be Too!," Brochure Information. No date.

"60% of Fortune's Power 25 Elite Use Capitol Advantage," Capital Advantage Brochure Information. No date.

"Visit the Future of Grassroots—States At Your Fingertips Online," Capital Advantage Brochure Information. No date.

"What the News Media Says About NETroots Websites," NETroots Brochure Information. No date.

IDI Solutions Newsroom Manager$^{SM}$, Brochure Information. No date.

IDI Solutions Grassroots Manager$^{SM}$, Brochure Information. No date.

"PinPoint Communications Redefines Lobbying: Not Just Back Room Politics Anymore," Grassroots Lobbying Advertorial, *Campaigns & Elections*, Feb. 1999, p. 31.

"Policy.com in the News," Brochure Information. No date.

"Politics is Not Just a Hobby . . . It Is Your Duty! Christian Coalition Lobbying Software," Christian Coalition Weekly, http://www.cc.org. No date.

Coombs, Kathryn, "Grassroots Lobbying and the Internet Explosion: New Opportunities for Issue Campaigning," *Campaigns & Elections*, Feb. 1999, pp. 26–29.

Foskett, Ken, "Online Ads Vie for Backers —'It's Cheaper Than a Postage Stamp'," *The Atlanta Constitution*, Jun. 10, 1998.

Gill, Buddy, "Grassroots Advocacy: Applying Lessons from the Campaign Battlefield," *Campaigns & Elections*, Feb. 1999, pp.54–55.

Jackson, Tim, "Juno Hints at Shape of Things to Come," *Financial Times*, Jul. 1996.

Marlowe, Howard, "High Tech Lobbying —The Art & Craft of High Tech Lobbying on the Internet," Presentation, Marlowe & Company, Feb. 23, 1998.

McAllister, Bill, "Web Venture Links Lobbies, Legislation," *The Washington Post*, Jan. 27, 1998, p. A15.

Keller, Amy, "Shop Talk," *Roll Call*, Apr. 23, 1998, p. 15.

Levy, Doug, "On–line Firm Tries Political E–mail—Costs Less Than Mail or Phone," *USA Today*, Mar. 31, 1998.

Riedman, Patricia, "Juno Advocacy Network Eyes Political Ad Dollars—Ads to Prompt Voters to E–mail Representatives," *Advertising Age*, Apr. 6, 1998.

Shesgreen, Deirdre, "Cyberturf," *Legal Times*, vol. XXI, No. 33, Jan. 11, 1999.

Smith, James M., "Grass–Roots Mobilization Using The Web," *National Journal's Cloakroom*, Sep. 10, 1998, http://www.cloakroom.com/members/buzz/hypertext/1998archive/091098.htm.

"The Juno Advocacy Network," Brochure Information, Mar. 1998.

Penchansky, Alan, et al., "Juno Advocacy Network Appoints Roger Alan Stone as Director," pr@support.juno.com, Mar. 31, 1998.

Penchansky, Alan, et al., "Juno Advocacy Network Enables Grassroots Activism Over the Internet," pr@support.juno.com, Mar. 31, 1998.

Stone, Roger A., "20,000 E–mails in Two Weeks: The NEA Example," *Campaigns & Elections*, Feb. 1999, pp. 32–33.

AARP Webplace, http://www.aarp.org, Oct. 7, 1998.

"Banner Ad with 1 Microsite that Generated E–mails to Members of Congress and Built a 20,000–name E–mail Mailing List," Juno Advocacy Network Promotional Material, Aug. 1999.

Lee, Jeanne C., "Cool Companies—Juno Online Services," *Fortune*, Jul. 7, 1997, Excerpt.

"Dial–Up Political Access," *The Washington Post*, Dec. 28, 1998, Business Section.

"Guide to the U.S. Congress," Christian Coalition, http://www.christian–coalition.org. No date.

"Juno and IDI Announce Internet Lobbying Alliance," http://www.juno.com/corp/news/1998/idi.html, Dec. 21, 1998, pp. 1–2.

Lobbying and the Internet Conference Feb. 23, 1998—Program Agenda, American University/Bonner & Associates.

"Make Your Voice Heard!" AARP Webplace, http://congress.nw.dc.us/aarp. No date.

"New! Freemark Mail, HotMail, Juno, Mercury Mail—Forget E–mail, Try Free Mail," *PC Computing*, Nov. 1996, Reprint.

"1998 Special Report on the Internet and Politics—An Analysis of Trends, Strategies and Practices Throughout the World," *PoliticsOnline's . NETPULSE*, vol. 2, No. 1, Jan. 7, 1998, pp. 1–6.

Pressman, Aaron, Digital Shelf Space, *WIRED*, Dec. 1995, Reprint.

"Seize the Moment on Religious Persecution Bill—'This is a Historic Opportunity to Protect People of Faith Around the Globe'," Christian Coalition, http://www.cc.org.

Meddis, Anne, "Lobbying Online—Dial–up E–mail Service Puts Power in People's Hands," *Montgomery Journal*, Apr. 1998.

Ornstein, Norman, et al., "The Promise & Perils of Cyber-democracy," *The American Enterprise*, pp. 53–54. No date.

* cited by examiner

FIG. 7

Member Profile

701 — 15: What sorts of programs do you like to watch on TV?

|  | Sometimes watch | Often watch | Watch daily |
|---|---|---|---|
| 702 — News | ○ | ○—703 | ○ |
| Daytime talk shows | ○ | ○ | ○ |
| Late night talk shows | ○ | ○ | ○ |
| Game shows | ○ | ○ | ○ |
| Educational | ○ | ○ | ○ |
| Cartoons | ○ | ○ | ○ |
| Feature films | ○ | ○ | ○ |
| Made-for-TV movies | ○ | ○ | ○ |
| Musical programming | ○ | ○ | ○ |
| Music videos | ○ | ○ | ○ |
| Sitcoms | ○ | ○ | ○ |
| Stand-up comedy | ○ | ○ | ○ |
| Soap operas | ○ | ○ | ○ |
| Sports | ○ | ○ | ○ |
| Political commentary | ○ | ○ | ○ |
| Financial programs | ○ | ○ | ○ |

☐ I never watch any of these types of programs

[<Back] 705    [Next>] 704    [Cancel]    [Help]

2500

ADVOCACY ADVERTISEMENT

Please be aware that your congressman, Representative Smith, is scheduled to vote shortly on proposed legislation that may allow triple tractor-trailer trucks on the Interstate Highways. Clicking "Yes" will automatically send the following e-mail to Representative Smith, signed by you, indicating that you are concerned about this matter. Please help!

2510 — o YES, Please send          o No, don't send

Dear Representative Smith:

As a mother who lives in, and drives on the highways in, your district, I am concerned about proposed legislation that would allow triple tractor-trailer trucks on the Interstate Highways.— An amendment to do just that will be coming up for a vote shortly. I hope that you will stand up for safety and vote against HR 1000 when it comes to floor if it contains the amendment allowing these dangerous vehicles to share the road with me and my family.

I look forward to hearing your position on this important issue and certainly hope that all of the concerned families and voters of your district can count on you to do the right thing and support keeping this menace off of our highways.

Sincerely,

Jane Jones
23 State Street
Mountain View, CA 93222

Dear Representative Smith:

As a mother who lives in, and drives on the highways in, your district, I am concerned about proposed legislation that would allow triple tractor-trailer trucks on the Interstate Highways. An amendment to do just that will be coming up for a vote shortly. I hope that you will stand up for safety and vote against HR 1000 when it comes to floor if it contains the amendment allowing these dangerous vehicles to share the road with me and my family.

I look forward to hearing your position on this important issue and certainly hope that all of the concerned families and voters of your district can count on you to do the right thing and support keeping this menace off of our highways.

Sincerely,
Jane Jones
23 State Street FIG. 16
Mountain View, CA 93222

FIG. 16

NATIONAL EDUCATION ASSOCIATION

DEAR REPRESENTATIVE:

AS A CONSTITUENT FROM YOUR DISTRICT AND A STRONG SUPPORTER OF CHILDREN AND PUBLIC EDUCATION, I URGE YOU TO VOTE AGAINST HR 4274, THE FY 99 LABOR-HEALTH AND HUMAN SERVICES-EDUCATION APPROPRIATIONS BILL. THIS MEASURE SHORTCHANGES AMERICA'S CHILDREN BY CUTTING CRITICAL RESOURCES FOR EDUCATION PROGRAMS BY $2 BILLION BELOW PRESIDENT CLINTON'S BUDGET REQUEST.

PLEASE SUPPORT BIPARTISAN LEGISLATION TO INCREASE OUR INVESTMENT IN EDUCATION BY AT LEAST 15 PERCENT AND FUND KEY PRIORITIES, INCLUDING SCHOOL BUILDING MODERNIZATION, CLASS-SIZE REDUCTION, AND TITLE I MATH AND READING PROGRAMS. WITH YOU HELP, ALL OF AMERICA'S CHILDREN CAN ATTEND A 21ST CENTURY SCHOOL.

SINCERELY,
DEMO USER
1540 BROADWAY
NEW YORK, NY 10036

[YES, SEND MY E-MAIL AT NO COST OT ME!]   [BACK]

PAID FOR BY THE NATIONAL EDUCATION ASSOCIATION. THE VIEWS EXPRESSED IN THIS MESSAGE ARE THOSE OF THE N.E.A. AND DO NOT IMPLY ENDORSEMENT BY JUNO ONLINE SERVICES.

FIG.17

METHOD AND APPARATUS FOR DELIVERING ELECTRONIC ADVOCACY MESSAGES

CROSS-REFERENCE TO RELATED APPLICATIONS

The present invention is a continuation-in-part of U.S. patent application Ser. No. 09/153,145 entitled "Electronic Mail System With Advertising" and filed Sep. 14, 1998 now U.S. Pat. No. 6,199,106, which is a continuation of U.S. patent application Ser. No. 08/638,739, of U.S. Pat. No. 5,809,242, filed Apr. 19, 1996; and a continuation-in-part of U.S. patent application Ser. No. 09/206,343 entitled "Method and Apparatus for Scheduling the Presentation of Messages to Computer Users" and filed Dec. 7, 1998 (pending), which is a continuation of U.S. patent application Ser. No. 08/636,745 U.S. Pat. No. 5,848,397, filed Apr. 19, 1996. The entire contents of all of these applications and patents are hereby incorporated by reference.

The present invention also claims priority to U.S. Provisional Patent Application Ser. No. 60/103,380 entitled "Electronic Mail System Advocacy Network" and filed Oct. 7, 1998.

FIELD OF THE INVENTION

The present invention is directed to communication networks. In particular, the present invention is directed to a method and apparatus for delivering electronic advocacy messages.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Electronic mail (or "e-mail") is becoming a popular way for people to communicate. Using e-mail, a person can send messages and other information (such as pictures, sound recordings, formatted documents, etc. that are in digital form) electronically to other e-mail users.

E-mail communication systems are generally regarded as multi-cast store-and-forward bi-directional communication systems. A user can send e-mail messages to one or more recipients at a time. An e-mail system is regarded as bi-directional as, usually, a user can both send and receive e-mail messages.

When using e-mail to communicate, a user will typically create a message using an e-mail program running on a computer that is or can be connected by a network to other computers. The message will include the e-mail address of the intended recipient. When the user has finished entering the message, the user will "send" the message to the intended recipient—the message is electronically transmitted via the computer network. The recipient, also using an e-mail program running on a computer connected to the computer network, can then read the received message.

A common computer network used to send and receive e-mail is the Internet. The Internet allows users to send and receive e-mail to and from computers around the world.

Typically, each user will have an Internet e-mail address unique to that user, e.g., bob@pto.com. A user with an e-mail account and a computer that can connect to the Internet can easily send and receive e-mail over the Internet.

There are a number of ways that a user can connect to the Internet to send and receive e-mail. A user can have an account with a proprietary on-line network, such as, for example, Prodigy, America Online, CompuServe or Microsoft Network. Using a computer with a modem, the user dials up the on-line network's access number and connects to the on-line network. The user can then send and receive e-mail to and from other users of the on-line network and, provided that the on-line network is connected to the Internet, with those having an Internet e-mail address. An alternative method to connect with the Internet is via an Internet Service Provider. Using a modem, the user dials the access number of the Internet Service Provider, and establishes a connection with a computer "directly" connected to or part of the Internet. The user can then operate an e-mail program, such as Eudora, to send and receive e-mail over the Internet.

In many existing systems, users read and write e-mail while on-line, i.e., while connected to the on-line network or the Internet Service Provider. Costs of operating the on-line network (including communication and hardware costs) are higher when users are connected to the network. Also, some on-line networks and Internet Access Providers charge per minute of connect time. Accordingly, it is more cost effective if users read and write e-mail messages when off-line (e.g., when not connected to the on-line network).

Some existing on-line services display additional content to users. For example, advertisements are shown on part of the screen to users of the America Online network. When accessing certain World Wide Web sites on the Internet, advertisements are often included as part of the web page seen by the user. Often in such systems, each user accessing a certain screen or site is shown the same advertisement. Sophisticated systems have the capability to change the advertisement after a certain period of time. However, in such systems the user must remain connected to the network to see the replacement advertisement.

When using a browser program (such as Netscape's Navigator program) to access pages on the World Wide Web, information, which may include additional content such as advertisements, may be downloaded and cached at a user's computer. This information can be flushed from the cache at a later time, as determined by the browser program. In some cases, this information may be flushed when the browser program is "off-line." However, additional content such as an advertisement is not automatically replaced in a web page and new, unseen content is not displayed as part of a web page when in such disconnected mode.

Accordingly, there is a need for a system that displays and automatically replaces additional content while disconnected from the network. In particular, there is a need for an e-mail system that operates mostly off-line and that can display and automatically replace additional content while off-line.

Suppliers of additional content, such as advertisers, find it desirable to target content to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For prior on-line systems and networks, including the World Wide Web, it is often difficult for an advertiser to precisely determine whether its advertisements were actually viewed by a user and for how long, and whether the advertisement induced a response. Accordingly, there exists a need for a targeted system that also can provide information as to the characteristics of those who were exposed to the additional content, for how long the user was exposed, and at what times.

Existing e-mail systems have other disadvantages. In existing dial-up e-mail systems, a user is provided with an access telephone number to connect to the network. Typically, at the network there are a number of mail servers and each user's received e-mail messages are stored on one of those mail servers. Because many users use the same access number to connect to the network, the network requires capabilities to switch users to the mail server that stores that user's e-mail. Existing e-mail networks determine at the server side and while the user is on-line who the user is and that user's mail server, and then switch the user to that mail server—a time consuming operation, especially if there are many users accessing the network. There exists a need for an e-mail system where the network does not have to decide, as part of the switching process, which mail server is to be accessed by each user.

The present invention addresses problems that may arise when an advocacy group wants to have a number of people contact a representative, government official or entity, such as a particular elected representative. As used herein, an advocacy group may represent any person or group of people who want to send information about an issue to the public. The advocacy group may, for example, encourage a large number of people to contact a particular congressperson about an upcoming vote. It should be noted that the term advocacy group is not limited to groups committed to influencing particular legislative votes, but may include, by way of example, groups interested in administrate rulemaking, public referendums, petitions, and other actions associated with issue advocacy.

By way of example, a member of the public traditionally contacts a representative by writing a letter or by making a telephone call. Today, the use of e-mail messages for this purpose is increasingly common. In either case, however, a person is often not aware of important issues that may be affected by legislative (or other) action, when a vote might be scheduled that concerns a particular issue, who his or her representative is, how to contact the representative or whether the representative serves on a particular committee. Moreover, a person may not have time to find out this information, or the time to compose a detailed message about an issue.

To make it easier for a person to contact a representative, an advocacy group can set up an advocacy Web page. Generally, a person that visits such a Web page is asked to provide a name and address that is used to automatically create and send an e-mail message to that person's representative, such as an elected representative. The person's address may be used, for example, to select one or more representatives associated with that person (such as by correlating a ZIP code with a congressional district) and to sign the e-mail message with that address (so that the representative will understand that a constituent is sending the e-mail message). With this approach, however, only a limited group of people, already interested in the issue, will likely access the Web page—and those people may already be fully informed about an upcoming vote and/or how to contact their representative. In other words, an advocacy group may prefer to "push" information to the public as opposed to "pulling" the public to the information.

Additionally, many people are not comfortable sending a name and address through a public communications network such as the Internet. In general, requesting detailed information will simply reduce the effectiveness, i.e. lower the response rate, of an advocacy Web page.

Moreover, an advocacy group may want to reach a group of people having particular geographic, demographic and/or psychographic characteristics. The advocacy group may also want to receive contact information about such people or to receive answers to survey questions from such people. In addition, the advocacy group may want to receive a summary, or report, about a group's response to a particular advocacy message. The advocacy group may also want to test a number of different messages about an issue, and to compare the result (such as the response rate) of various styles or arguments.

SUMMARY OF THE INVENTION

The present invention is directed to a method and apparatus for delivering electronic advocacy messages. In a representative embodiment, one or more users are selected based on information in a user database containing, for example, demographic or psychographic information about users as well as information (such as a home address) that identifies at least one representative associated with each user. An advocacy message is sent to a user through a first communication network, such as by sending an advocacy message associated with an e-mail message. The advocacy message may include a portion that lets the user generate an indication, such as by clicking on a portion of a computer screen. When an indication is received, a response message is sent to the representative associated with the user. The response message includes information about the user, such as the user's name and home address, and may be sent at a pre-determined time along with response messages from other users. The response message may be an e-mail message, a facsimile message, a printed letter or a telephone call. The user can also provide answers to survey questions and/or grant permission to have his or her contact information provided to an advocacy party.

According to another embodiment of the present invention, a server system may utilize the information in a member profile to determine which advocacy messages, and/or other messages such as advertisements, should be directed to the user. Accordingly, an advertisement distribution scheduler of the server system may decide which advocacy messages are eligible for distribution for each user. The distribution scheduler of the server system may determine which advocacy messages and/or other messages are eligible for distribution to each user and can utilize information in an event log file and/or message statistics file in making the determination as to which advertisements are eligible for distribution to a particular user. The server system may also include a download scheduler module that determines when to download and/or display (i.e., transfer) a particular message to a user.

A client program may include a scheduler module that determines which advocacy message, and/or other messages such as advertisements, to display to the user and for how long.

The client scheduler module, the distribution scheduler and the download scheduler module are disclosed in U.S. Pat. No. 5,848,397 entitled "Method and Apparatus for Scheduling the Presentation of Messages to Computer Users" to Marsh et. al.

BRIEF DESCRIPTION OF THE DRAWINGS

FIG. 7 shows a portion of an exemplary survey to create a member profile.

FIG. 15 illustrates an example of an advocacy advertisement.

FIG. 16 illustrates an example of an advocacy e-mail message.

FIG. 17 is another example of an advocacy advertisement.

DETAILED DESCRIPTION

Figure 1:
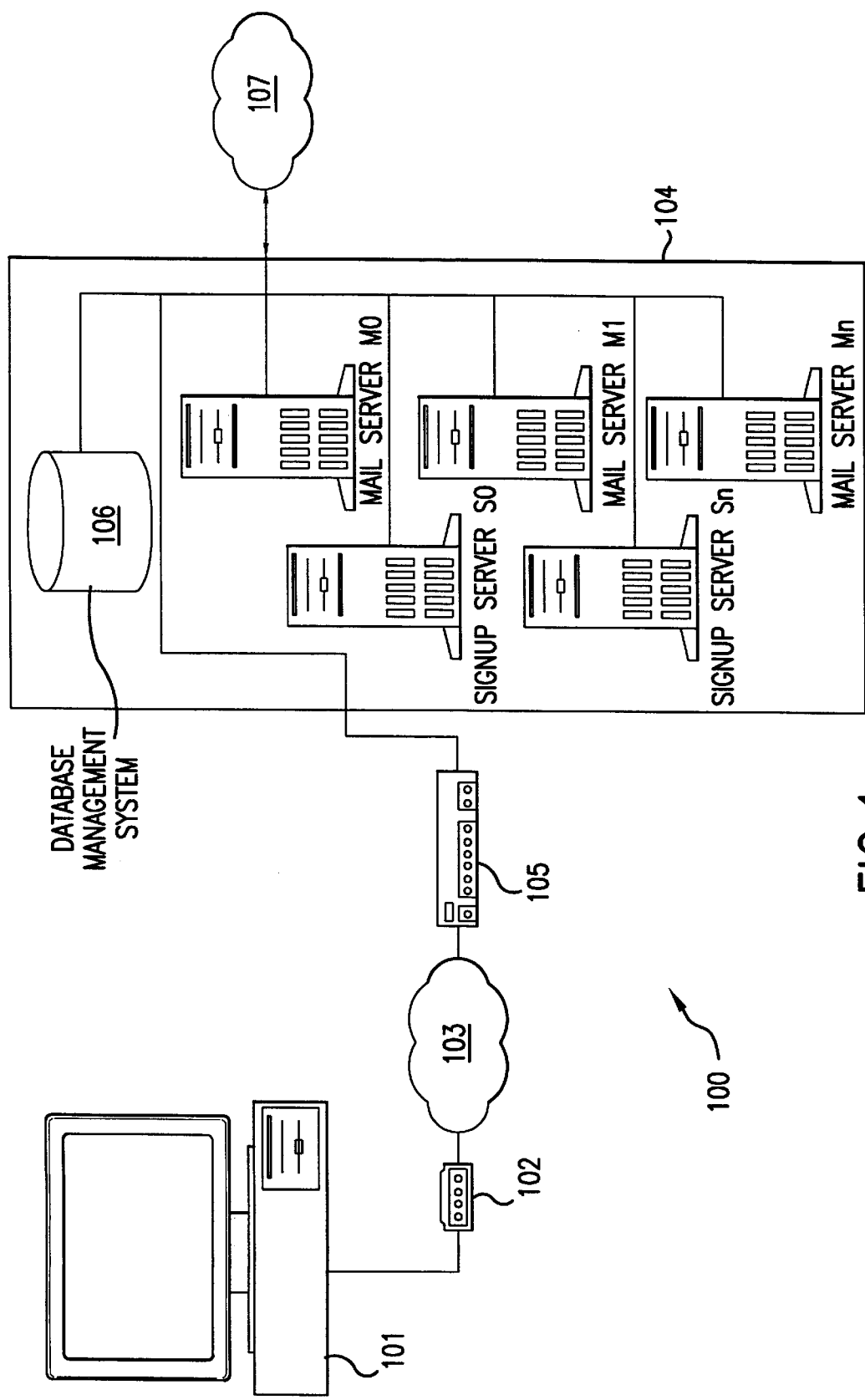
FIG. 1 is a system diagram of a representative embodiment of the present invention.

Referring now to the drawings, FIG. 1 illustrates an exemplary system configuration 100 of a representative embodiment of the present invention. The representative embodiment is described in reference to an electronic mail system where a number of users can create, send, receive and read e-mail messages. E-mail messages can be sent between users of the present invention and external users who have e-mail accounts. However, the principles of the present invention should not be regarded as limited solely to e-mail systems. For example, the principles of the present invention apply to on-line services that present advertising to users while the user is accessing other content. Thus, an e-mail message may be regarded as an example of content provided to a user.

As shown in FIG. 1, a client computer 101, preferably a workstation or personal computer, executes a client program. The client computer can be used by one or more users.

Connected to the client computer 101 is a communication interface 102 for allowing the client computer 101 to communicate with other computer systems. The communication interface may be, for example, a modem operating at 56 kilobits per second (kb/s) or at a higher rate (such as a cable modem). As illustrated, the communications interface 102 is external to the client computer 101, but a communication interface 102 that is internal to or part of the client computer 101 is also acceptable. Although the communication interface 102 illustrated is a modem, the communication interface 102 alternatively could be a network interface unit or a network card or the like for providing connectivity to other computer systems over a network using such protocols as X.25, Ethernet, or TCP/IP, or any device that allows, directly or indirectly, computer-to-computer communications.

The client computer 101 is coupled via the communications interface 102 to a network 103. In the representative embodiment, the network 103 is the public telephone network, but it may be, for example, a proprietary wide area network or the like.

Figure 2:
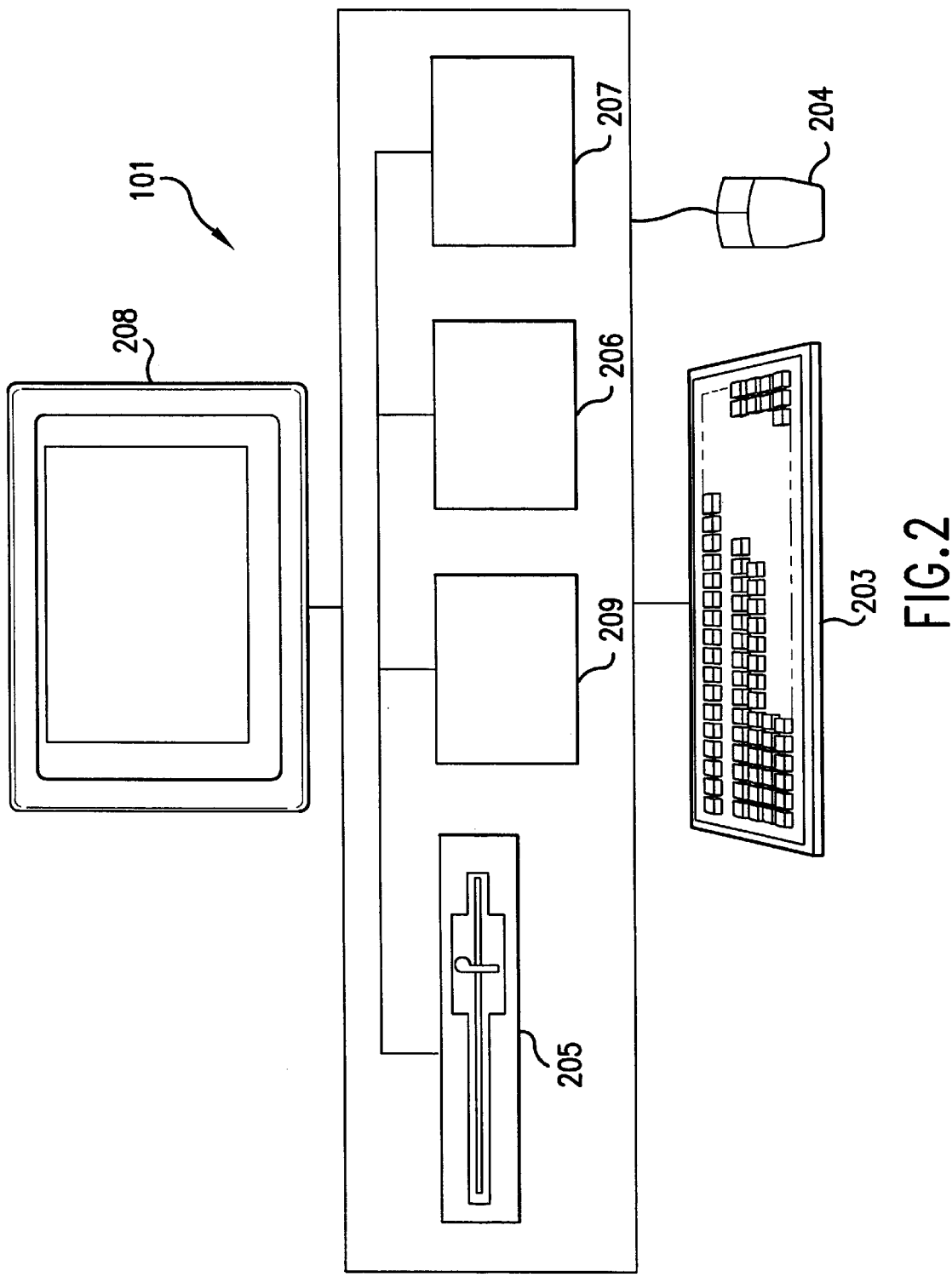
FIG. 2 is a block diagram of the client computer of FIG. 1.

FIG. 2 illustrates in further detail the hardware configuration of the client computer 101 of FIG. 1. In the representative embodiment, the client computer 101 comprises a central processing unit 209 for executing computer programs (including the client program according to the present invention) and managing and controlling the operation of the client computer 101. A storage device 205, such as a floppy disk drive, is coupled to the central processing unit 209 for, e.g., reading and writing data and computer programs to and from removable storage media such as floppy disks. Storage device 206, coupled to the central processing unit 209, also provides a means for storing computer programs and data. Storage device 206 is preferably a hard disk having a high storage capacity. A dynamic memory device 207 such as a RAM, is coupled to the central processing unit 209. The client computer 101 includes typical input/output devices, such as, for example, a keyboard 203, a mouse 204 and a monitor 208.

Referring again to FIG. 1, the client computer 101 selectively communicates with a server system 104 over the network 103 using the communication interface 102. The server system 104 is coupled to the network 103 via a communications server 105.

Although FIG. 1 shows only one client computer 101, it will be appreciated that the representative embodiment of the present invention can include many client computers 101 each capable of being coupled to the server system 104.

The server system 104 is preferably a computer system designed to communicate electronic mail (e-mail) messages. In the representative embodiment, the server system 104 is coupled to one or more external networks 107, such as the Internet, that allow for the sending and receiving of e-mail messages. The server system 104, acting as an intermediary, receives email messages from and causes e-mail messages to be sent to users who have established an account with the server system 104 and with external parties with e-mail addresses, such as Internet users or users of proprietary on-line services.

According to the present invention, the server system 104 also provides other information to and receives information from users of client computers 101, such as, for example, advertisements, software patches, statistical information, etc., as discussed in detail below.

In the representative embodiment, the server system 104 comprises a plurality of mail servers M0–Mn. Each mail servers M0–Mn stores e-mail messages for users of client computers 101 who have established an account with the server system 104.

Received e-mail messages, addressed to users who have accounts with the server system 104, are stored in the mail servers M0–Mn. According to the representative embodiment of the present invention, each user is assigned to one mail server M0–Mn. Messages received for a user who has an account with the server system 104 are stored in a directory on the mail server M0–Mn assigned to that user account. Each received e-mail message is stored in a file in the intended recipient's directory until the intended recipient requests received e-mail messages, as discussed below.

E-mail messages sent from a user are stored temporarily on a disk at the server system before transmission to the intended recipient.

One or more of the mail servers M0–Mn is preferably configured to transmit e-mail messages to and receive e-mail messages from non-users of the server system 104 (e.g., users of other e-mail systems) via external networks such as the Internet 107.

The server system 104 of the representative embodiment includes a database management system 106, coupled to each of the mail servers M0–Mn. The database management system 106 manages and stores information related to the operation of the present invention, such as, for example, member profile information, advertisement information, information used to bill advocacy groups, etc. The database management system 106 preferably includes a plurality of high capacity storage devices for storing and managing large amounts of data. (The hardware configuration of the database management system 106 can easily be varied, and may comprise, for example, a single processor coupled to a high speed storage device, or a distributed system comprising a plurality of servers.)

Alternative configurations of the server system 104 can be accommodated by the present invention. For example, e-mail messages may be stored centrally in a database management system such as the database management system 106 of the server system 104. Thus, each time a user connects to the server system 104, that user's received e-mail messages are retrieved from a central storage location.

In the representative embodiment of the present invention, the server system 104 also includes a plurality of signup servers S0–Sn. The signup servers S0–Sn allow for communication with first time users, preferably establishing and activating user accounts and providing new users with "binding" information (as described below).

Figure 3:
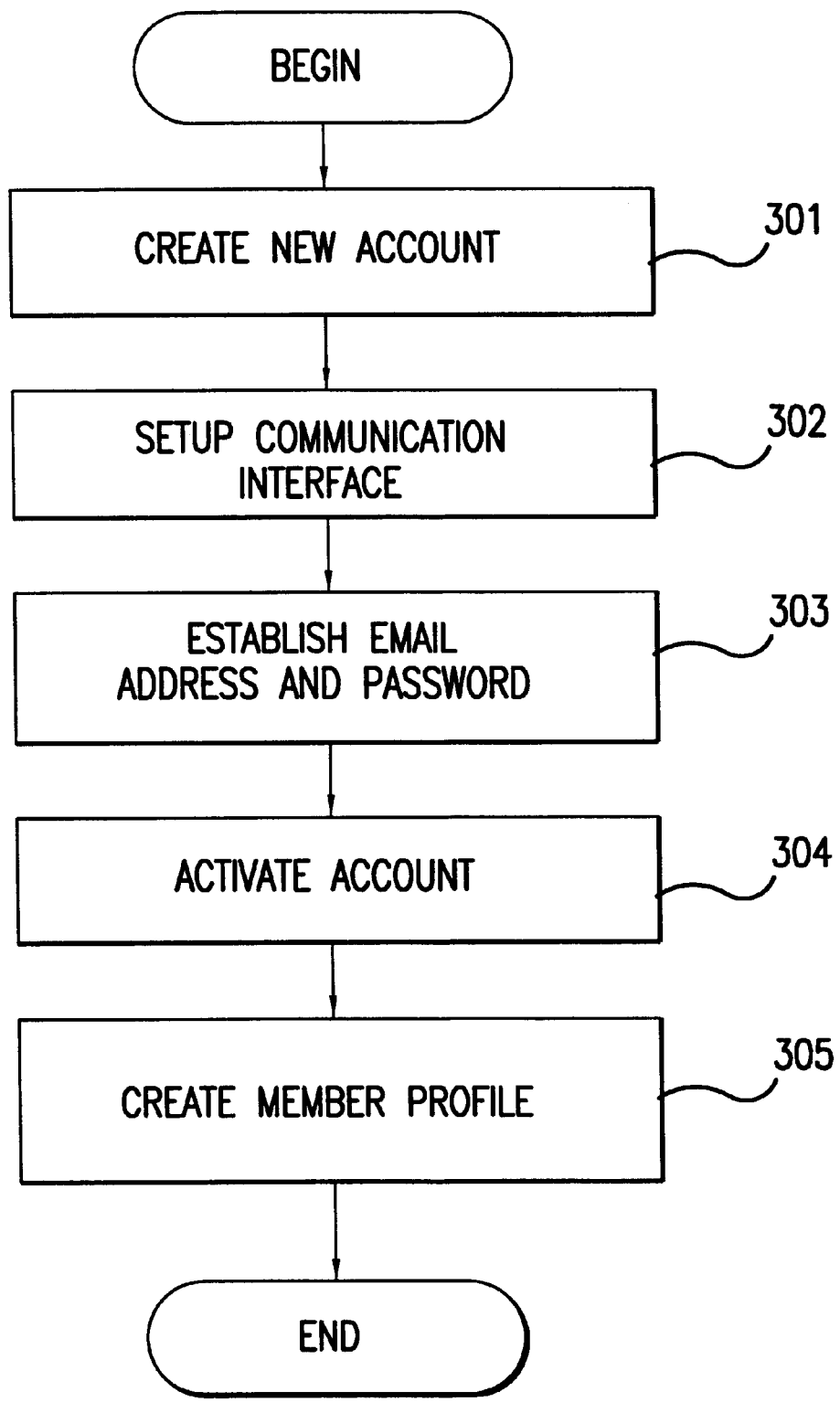
FIG. 3 is a flowchart of the client computer initialization process.

FIG. 3 illustrates, in flow chart form, the installation and account creation steps that take place at a client computer 101. Typically, the user is provided (e.g., on disk or electronically downloaded over the Internet) with a copy of a software program (the client program) that is executed by the client computer 101 according to the principles of the present invention. The user will install the client program on the client computer 101, for example, by executing an install program. The install program will create a directory on the storage device 206 and load the client program into that directory. In the representative embodiment, the install program will determine if there is enough space in the storage device 206 to install the client program and to later download advertisements. For example, the install program will set aside five megabytes of storage space on the storage device 206 for advertisements. This will ensure that there is a minimum amount of storage space available for the required number of advertisements that may be downloaded and stored in the future. The install program may also determine if the client program has previously been installed and if an old version of the client program has been installed that requires updating.

The client program and associated files are organized on the storage device 206 of the client computer 101 in a plurality of sub-directories. For example, assuming that the directory in which the client program is installed is named "mail", then in the representative embodiment, sub-directories of "mail" include "ads", "bad", "bin", "lib", "tmp", "user0". The "ads" subdirectory stores advertisements and an ad log recording statistics relating to advertisements. The "bad" subdirectory stores files not recognized by the advertisement system. The "bin" subdirectory stores the executable client program and related "dll" files. The "lib" subdirectory stores help files, modem configuration files, and bitmap images used in the display of the graphical user interface. The "tmp" subdirectory is used for temporary files. The "user0" subdirectory is a subdirectory created when a user establishes an account. Each time a user creates a new account (or a different user creates an account using the same client computer 101), a new subdirectory is created for that user account, e.g., "user1", "user2", etc. The "user" subdirectory includes an e-mail address book file, a user preferences and configuration file, and "get" and "put" subdirectories are "spooling" directories where data is temporarily stored while in transit between the client computer 101 and the server system 104.

Because files associated with the present invention are stored at the client computer 101, especially files comprising advertisements and usage information, a user may accidentally or maliciously delete, tamper with or add to such files and/or subdirectories. Accordingly, the present invention includes an authentication scheme to prevent and/or detect certain undesirable modifications. One such authentication scheme is disclosed in U.S. Pat. No. 5,838,790, entitled "Advertisement Authentication System in Which Advertisements Are Downloaded for Off-line Display" to McAuliffe et. al., which is expressly incorporated herein by reference.

Advertisements may be displayed to the user during installation.

Once the client computer software has been installed, the user can initiate local execution of the client computer software. In the representative embodiment, the client computer software operates in a graphical user interface (GUI) environment such as Microsoft Windows, Mac/OS, OS/2 and the like.

The first time that the client computer software is executed on the client computer 101 (and whenever a user wishes to establish a new account with the server system 104), the client program performs various functions intended to establish a new account for the user. In the representative embodiment, the first step is to collect new account information (step 301). At the request of the client program, the user inputs name, address, telephone number and other identification data. This information is stored on storage device 206.

Next, the client program configures the communication interface 102 to operate with the client program (step 302). For example, the client program may ask the user to identify the modem and modem speed or may autodetect the modem and modem speed. The user may also be asked to identify the type of telephone line (e.g., tone or pulse) and whether one must dial a certain number to reach an external line.

The client program requests that the user select an e-mail address and password (step 303).

Figure 4:
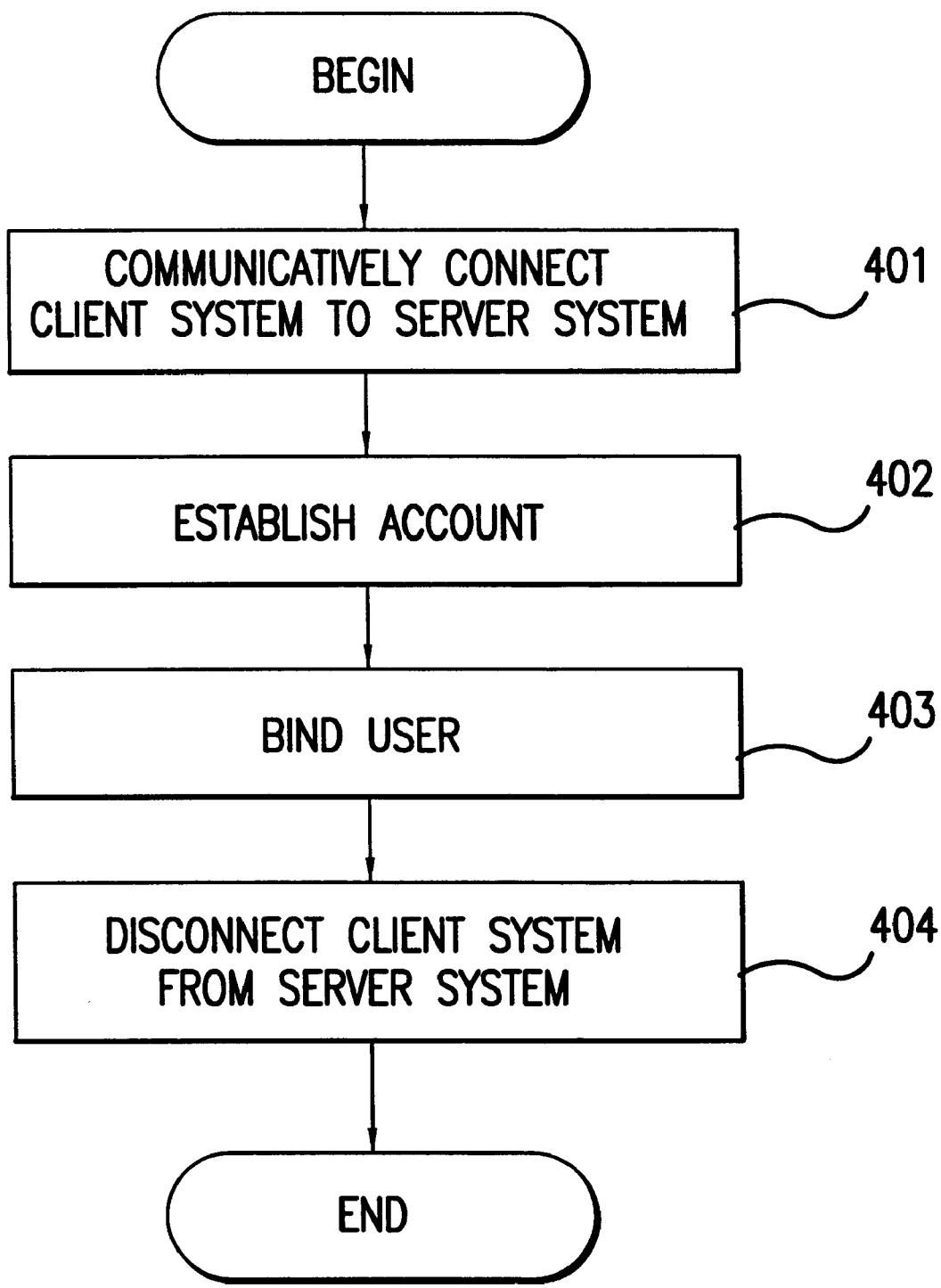
FIG. 4 is a flowchart detailing account activation.

The client program then initiates a connection with the server system 104 to activate an account for the user (step 304). FIG. 4 illustrates this activation step in further detail. The client computer 101 establishes communication with the server system 104 via the communication interface 102 (step 401). In the representative embodiment, first time users interfacing with the server system 104 are coupled to one of the plurality of signup servers S0–Sn. The particular signup server Sx that the user is first connected to is selected by the server system 104 in a round robin fashion.

On first time use, the client program passes to the server system 104 the selected user name and password. Signup server Sx establishes an account for the user, e.g., queries the database management system 106 to determine whether the requested e-mail address is unique to the server system 104, and if it is, creates an entry in the database management system for that user (step 402). Signup server Sx then assigns (or "binds") the user to one of the plurality of mail servers M0–Mn (step 402). The binding information (e.g., the identity of the mail server) is transmitted to the client computer 101 and stored on the storage device 206 for later use.

After the account has been activated, the client computer disconnects from (i.e., terminates communication with) the server system 104 (step 404), and in particular disconnects from signup server Sx.

Referring again to FIG. 3, once the user's account is activated (step 304), the user is asked to complete a member profile (step 305). This step takes place when the client computer 101 is off-line, i.e., not connected to the server system 104. In particular, the client computer 101 requests that the user provide information such as interests, hobbies, recent purchases, demographic information, etc., in the form of a survey. FIG. 7 shows as an example of one portion of a representative survey. Illustrated is question fifteen 701 of the member profile. The user responds to the illustrated question 701 by clicking on the appropriate circle next to each option, thus "filling in" the circle. For example, in response to "What sorts of programs do you like to watch on TV?,"—if the user watches "News" 702, the user clicks on the circle representing an appropriate answer. Thus, if the user watches the "News" 702 often, he clicks on circle 703. After clicking on all the appropriate circles representing responses, the user may move ahead in the profile—that is, to the next questions—by clicking on a "Next >" button 704. If the user wants to go back to earlier questions and responses, possibly to change an answer, the user clicks on a "<Back" button 705.

The user's responses (i.e., the completed member profile) are stored on the client computer 101 storage device 206 for future transmission to the server system 104. In the representative embodiment, the member profile is transmitted to the server system 104 when the user first sends or receives e-mail. The information can be used by the server system 104 to aid in selecting or targeting advertisements and e-mail messages containing advertisements to desired users. The member profile can be updated by the user and will then be transmitted to the server system 104 when the user next connects with the server system 104 to sent or receive email messages. When transmitted, the member profile is stored at the server system 104 on the database management system 106.

Once the member profile is completed, initialization is complete. The user at the client computer 101 can now create, send, receive, and read e-mail messages.

It will be appreciated that in alternative embodiments, the member profile may be transmitted to the server system 104 at step 304 along with the selected e-mail address and password.

Figure 5:
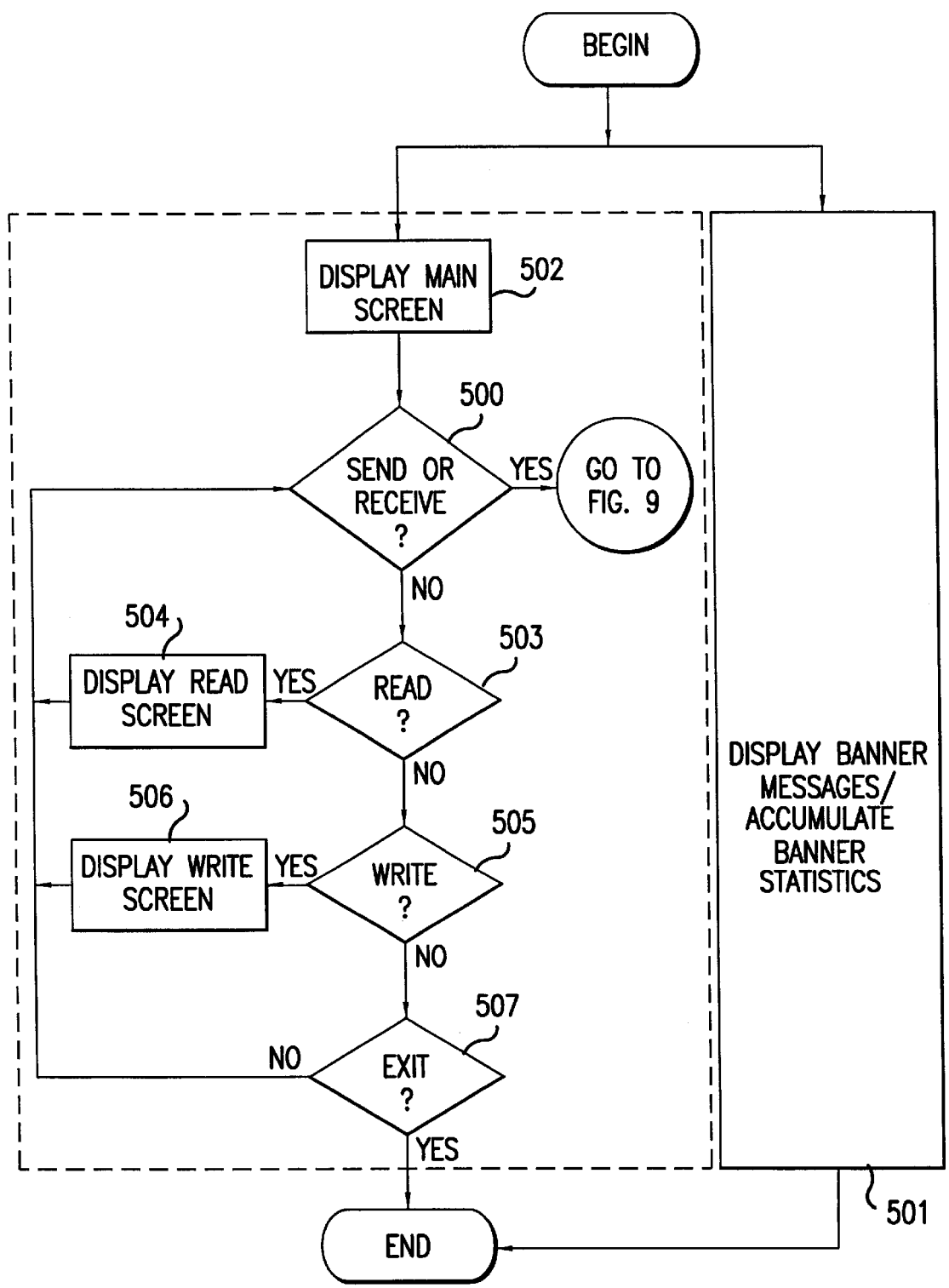
FIG. 5 represents actions that take place at the client computer.

FIG. 5 illustrates, in flow chart form, typical steps followed by the client computer 101 when the client software is executed after the initial sign-up process. This flow chart is for purpose of explanation and does not necessarily reflect all possible paths of control flow in the execution of the client program.

The client computer 101 displays advertisements on a portion of the user's display terminal 202 (step 501). As illustrated, advertisements are displayed continuously during the operation of the client software, and in particular, when the client computer 101 is not in communication with the server system 104. This is possible because the advertisements are stored on the client computer 101.

In the representative embodiment there are two types of advertisements. Banner advertisements 800 are displayed at step 501 when the user is reading and creating e-mail messages, or performing other administrative tasks, e.g., moving e-mail messages between folders. In the representative embodiment, banner advertisements 800 are displayed in a box at the top right side of the window (see FIGS. 8 and 12). Showcase advertisements are displayed whenever the user is attempting to establish a connection with the server system 104 and when information is being transferred between the client computer 101 and the server system 104. The banner and showcase advertisements may be textual, graphical, or video data (or combinations thereof) and may be stored in a standard compressed data format, such as JPEG or MPEG, or in a proprietary format, or in an uncompressed format. Typically, advertisements are simple graphics files. Sounds may also be included.

The banner advertisement 800 shown to the user prior to sending or receiving e-mail messages for the first time can be an advertisement previously received from the server system 104 (e.g., during the account creation process) or an advertisement obtained from the installation disk. The banner advertisement 800 displayed is stored in a file on storage device 206 (e.g., in the "ads" subdirectory). The stored banner advertisements 800 can be stored in a compressed format and decompressed immediately prior to display.

In the representative embodiment, each banner advertisement 800 is replaced by another one of the stored banner advertisements after a predetermined time has elapsed. The banner advertisement is continuously updated or replaced by the client computer 101 while the client program of the present invention is executing. Each banner advertisement 800 is displayed for a predetermined time and in accordance with a schedule that is preset or determined by the client program "on-the-fly". The client scheduler module, the distribution scheduler and the download scheduler module are disclosed in U.S. Pat. No. 5,848,397 entitled "Method and Apparatus for Scheduling the Presentation of Messages to Computer Users" to Marsh et. al.

The banner advertisements 800 may be interactive. For example, by clicking on the banner advertisement 800, the user may be provided with further information concerning the subject matter of the current banner advertisement 800. The further information may be, for example, another related banner advertisement 800 stored on storage device 206.

By clicking on the banner advertisement 800, the user may be provided with an e-mail message template to create an e-mail message (as described in connection with FIG. 12 below), having the addressee already filled in with the e-mail address of a company or advocacy group associated with the subject matter of the current banner advertisement 800. In this manner, the user may, for example, provide comments to the company or advocacy group regarding the subject matter of the banner advertisement 800 or request further information. Alternatively, clicking on the banner advertisement 800 may cause an e-mail message to be automatically completed (including the message) and either transmitted immediately or stored in the user's "outbox" folder (described later). The message may merely identify the user to the addressee of the e-mail message as someone interested in the subject matter of the banner advertisement 800.

In accordance with the representative embodiment, advertisements are preferably described in a file using a page description language ("PDL"). The PDL is a simple notation for describing the graphical objects or elements that form each advertisement. Accordingly, associated with each advertisement is a file containing the advertisement's description written in the PDL. A specification for a representative PDL is illustrated below:

Type: Page Head
Name: Name of the page
Width: width of page in pixels
Height: height of page in pixels
Color<optional>: color
File Name<optional>: file name
. . .
Type: Text
Name: Name of the element
Left: position w/r/t left side of ad page
Top: position w/r/t top of ad page
Width: width of text in pixels
Height: height of text in pixels
Text: textual message
Font<optional>: font
Font Style<optional>: Bold|Italic|Underline|Strikeout
Font Height<optional>: font height in pixels
FG Color<optional>: text color
BG Color <optional>: background color
Justify<optional>: Right|Center|Left(default)
. . .
Type: Button
Name: Name of the element
Left: position w/r/t left side of ad page
Top: position w/r/t top of ad page
Width: width of text in pixels
Height: height of text in pixels
Text: textual message
Up<optional>: file name of bitmap for button in up position
Down<optional>: file name of bitmap for button in down position
Focus<optional>: file name of bitmap for focus button
OnClick/Action: action to be performed when user clicks the button. Choose one action of the following:
  pdl modal<file name>create new dialog to display the new ad
  pdl inherit<file name>use the current dialog to display the ad
  log<an id assigned to the ad>log an event to the ad log to be processed by the server
  submit<form name>submit all the values from the form collected in the ad
  request<recipient E-mail><subject line>compose a message and put it into user's outbox
  mail<recipient e-mail><subject line>switch to the writer, fill in the To and Subject
  msg<message text>display a message
Message <optional>: message to be displayed when user clicks the button
Data: specify any auxiliary data for the action Font: font
Font Style: Bold|Italic|Underline|Strikeout
Font height: font height in pixels
. . .
Type: Hotspot
Name: Name of the element
Left: position w/r/t left side of ad page
Top: position w/r/t top of ad page
Width: width of text in pixels
Height: height of text in pixels
Text: textual message
OnClick/Action: action to be performed when user clicks the hotspot. Choose one action of the following:
  pdl modal<file name>:create new dialog to display the new ad
  pdl inherit<file name>:use the current dialog to display the ad
  log<an id assigned to the ad>: log an event to the ad log to be processed by the server
  request<recipient e-mail><subject line>: compose a message and put it into user's outbox
  mail<recipient e-mail><subject line>: switch to the writer, fill in the To and Subject
  msg<message text>: display a message
Message<optional>: message to be displayed when user clicks the hot spot
Data: specify any auxiliary data for the action
. . .
Type: Background
Name: Name of the element
Left: position w/r/t left side of ad page
Top: position w/r/t top of ad page
Width: width of text in pixels
Height: height of text in pixels
Color: color
File name<optional>: specify the bitmap to use or the bitmap which contains the background color
. . .
Type: BMP
Name: Name of the element
Left: position w/r/t left side of ad page
Top: position w/r/t top of ad page
Width: width of text in pixels
Height: height of text in pixels
File name: the bitmap file
Wipe<optional>: TRUE (do wipe with any of the available wipe modes)|FALSE (no wipe)|LTOR (left to right)|RTOL (right to left)|MID (expand from middle)|END (start from two ends)
. . .

In the representative embodiment, all advertisement definitions include a "Page head" and may include one or more of the other illustrated types.

Type: Page Head:
"Page Head" defines the basic structure of the advertisement including the "Width" and "Height" of the advertisement, as well as the color ("Color" or "File Name" fields).

Type: Text
"Text" specifies a text string at a particular location. The "Name" field defines an identifier for the "Text" object being defined. The "Left" and "Top" fields indicate the position of the text string within the advertisement. "Width" and "Height" provide the dimensions of the text. The "Text" field specifies the text string to be displayed. The "Font," "Font Style," and "Font Height" fields identify textual font information. "FG Color" and "BG Color" identify the color of the text and the color of the background respectively. The "Justify" field specifies the text justification.

Type: Button

"Button" defines a clickable GUI button. The "Name" field specifies an identifier for the button being defined. "Left" and "Top" specify the position of the button while "Width" and "Height" define the dimensions of the button.

The "Text" field specifies a text string to be displayed on the button. For a bitmap button, "Up," "Down," and "Focus" specify bitmaps for the button in the up, down, and focus positions respectively.

The "OnClick/Action" field specifies the action to be performed when a user clicks on the button. One of six actions may be performed. If "pdl modal <file name>" is specified, a new dialog is created to display a new advertisement. The file name specified is the file containing the definition of new advertisement. If "pdl inherit<file name>" is specified, the current dialog is used to display the new advertisement defined in file "file name." If "log" is specified, an event is logged into the ad log.

"Request <recipient e-mail><subject line>" causes the client computer to automatically compose an e-mail message addressed to the identified "recipient." The subject of the e-mail message is filled in with the text specified in the second parameter, i.e., subject line. The e-mail message is then put into the user's outbox.

If "mail<recipient e-mail><subject line>" is defined as the action to be performed, the client computer switches to the "write" screen, automatically filling in the address and the subject of an e-mail message. The user can then fill in the message body.

Finally, if "msg" is specified, a textual message is displayed to the user when the user clicks the button.

The "Message" field for type "Button" specifies a message to be displayed when the user clicks on the button.

The "Data" field identifies auxiliary data for the action.

Additionally, for each button, "Font," "Font height," and "Font style" may be specified for the button text.

Type: Hotspot

"Hotspot" is similar to a GUI button and is defined in a fashion similar to a button.

Type: Background

"Background" is used to fill a specified rectangle with a selected color or identifies a bitmap to fill the specified rectangle. The "Left" and "Top" fields define the position of the background while the "Width" and "Height" fields define the dimensions of the background. The "Color" field identifies the color of the background. The "File name" field identifies a bitmap to use to fill in the rectangle.

Type: BMP

"BMP" specifies a bitmap. The "Left" and "Top" fields define the position where the bitmap is to be displayed while "Width" and "Height" define the display dimensions of the bitmap. The "File name" field identifies the bitmap file. Finally, the "Wipe" field specifies if the bitmap is to wipe when display, and if so, how it should be wiped.

The client computer 101 also logs statistics regarding the advertisements displayed (also step 501) in a file stored on storage device 206. For example, each time a new banner advertisement 800 is displayed, the client computer 101 logs the identification of the banner advertisement 800, the time and date it was displayed, and duration of the display.

Figure 8:
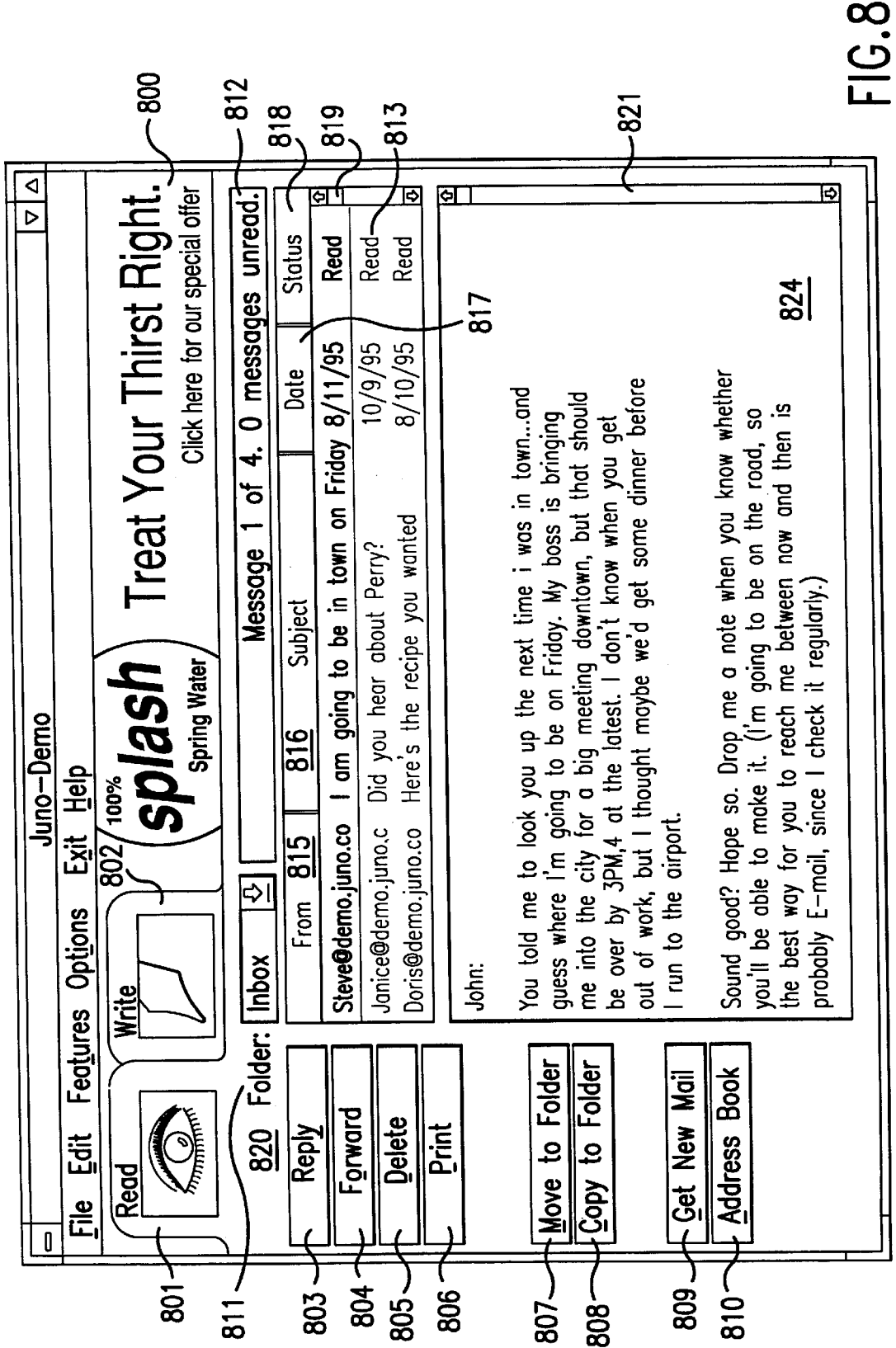
FIG. 8 illustrates an example read screen used to read received e-mail messages.

While the banner advertisement 800 is displayed, the user can read and create e-mail messages using a graphical user interface of the present invention (steps 500 and 502–507). At step 502, the client program causes a main screen to be displayed. FIG. 8 is a representative example of a typical main screen.

As illustrated in FIG. 8, the user is presented with two "tabs" representing main system functions, a read tab 801 and a write tab 802. Clicking on read tab 801 (step 503) or write tab 802 (step 505) causes a screen for either reading or creating e-mail messages to be displayed. In FIG. 8, the read tab 801 has been selected, thus allowing the user to read e-mail messages that have been transferred to the client computer 102. Thus, from FIG. 8, if the user selects the write tab 802 (step 505), a write screen 1220 is displayed as in FIG. 12 (step 506). From FIG. 12, if the user selects the read tab 801, a read screen 820 is displayed as in FIG. 8 (step 504).

When the read screen 820 is displayed, the user can read e-mail messages that have been transferred to the client computer 101. When the write screen 1220 is displayed, the user can create e-mail messages. It will be appreciated that reading and creating e-mail messages is done off-line, and that banner advertisements 800 are displayed to the user and updated while the user is reading and creating e-mail messages. E-mail messages that are created can be textual, graphical, and may include attached files.

Referring now to the read screen 820 of FIG. 8, the user at client computer 101 is presented with various read subfunctions displayed as clickable buttons labeled "Reply" 803, "Forward" 804, "Delete" 805, "Print" 806, "Move to Folder" 807, "Copy to Folder" 808, "Get New Mail" 809, "Address Book" 810. In the representative embodiment, e-mail messages are stored in folders, e.g., an Inbox folder for received e-mail messages and an Outbox folder for unsent e-mail messages. The user may create additional folders, and move e-mail messages between folders. The folders are subdirectories in the subdirectory allocated to a particular user (e.g., subdirectory "user1") of the client computer 101.

The read screen 820 displays the name of the current e-mail folder 811, a status display 812 showing the status of e-mail messages stored in the current e-mail folder 811, an e-mail list 813 showing a list of the e-mail messages stored in the current e-mail folder, and an open e-mail text box 824 displaying the content (e.g., text) of a selected e-mail message.

Information concerning e-mail messages stored in the current folder is displayed in an email list 813. The information preferably includes the user name and address of the sender ("From" 815), the subject of the e-mail message ("Subject" 816), the date of the e-mail message ("Date" 817), and the status of the e-mail message ("Status" 818). As shown in FIG. 8, information concerning only three e-mail messages is displayed, but the user can scroll through information concerning other e-mail messages stored in the folder using scroll bar 819.

By selecting (e.g., clicking on) one of the displayed list elements in e-mail list 813, the user can "open" the corresponding e-mail message. Once opened, the content of the e-mail message is displayed in the e-mail text box 824. The user can scroll through the content of the message using scroll bar 821.

Once an e-mail message is open, the user can read the message and choose to reply to the message by clicking on the reply button 803. This opens the write screen 1220 (FIG. 12) and creates a template for an e-mail message, with the addressee field completed. In particular, if a user replies to the e-mail message highlighted in FIG. 8, the reply e-mail message will be addressed to "Steve@demojuno.com". Processing of this new message is similar to that of other e-mail messages created by the user.

The user can also choose to forward the open e-mail message by clicking on the Forward button 804. In response to clicking on the Forward button, the client computer 101 creates a template for an e-mail message and also attaches a copy of the open e-mail message.

The user can also choose to delete the open message by clicking on the Delete button 805. This causes the client computer 101 to erase or remove the file containing the open e-mail message from the storage device 206. In the representative embodiment, the file may be marked as "deleted" and then actually deleted at the end of the user's session.

The open e-mail message can also be printed on a printer that is coupled to client computer 101. To print an e-mail message, the user selects the Print button 806.

Received e-mail messages can be moved to and copied to other folders by clicking on the "Move to Folder" button 807 and "Copy to Folder" buttons 808 respectively. When the "Move to Folder" button 807 is clicked, the user is asked to identify the folder to which the open e-mail message is to be moved. If the user identifies a non-existent folder, the client computer 101 creates a new folder with the name identified by the user and associates the e-mail message with the new folder, removing the e-mail message from the old folder. Otherwise, the open e-mail message is associated with the identified existing folder and is removed from the old folder.

Clicking the "Copy to Folder" 808 copies the open e-mail into a folder identified by the user and leaves the original e-mail message in the old folder.

The user can retrieve new e-mail messages and send created e-mail messages (step 507). The user can choose to retrieve new e-mail messages from the server system 104 by clicking on the "Get New Mail" button 809. The user can choose to send e-mail messages by clicking on the "Send Mail" button 1209 of FIG. 12. (The user is also given the option to retrieve new e-mail messages whenever the user starts the client program.)

Figure 9:
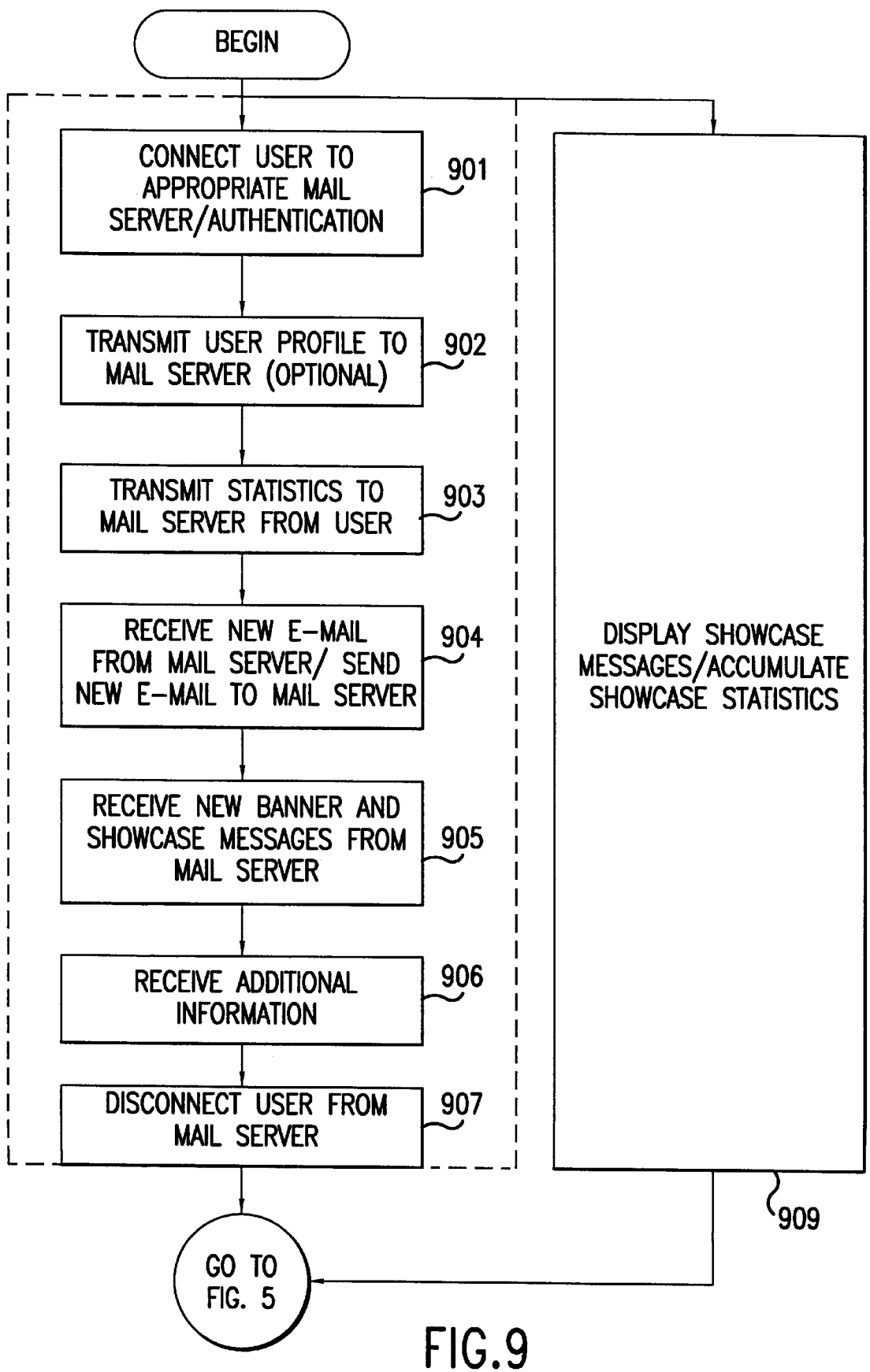
FIG. 9 is a flowchart of the communication process that takes place between the client computer and the server system as performed by the client computer.

FIG. 9 illustrates in detail the steps performed by the client computer when the user sends or receives e-mail messages. When a user decides to send or get e-mail messages, the client computer 101 connects to a mail server M0–Mn of the server system 104 through communications server 105 (step 901). Among the other connection parameters passed from the client computer 101 to the communication interface 102 is the user name and binding information (e.g., the network login) that identifies which of the plurality of mail servers M0–Mn the user's client computer 101 should be connected to. Each user is associated or "bound" to a particular mail server M0–Mn.

Once the client computer 101 is connected to the appropriate mail server M0–Mn, the user must then be "authenticated." Authentication is accomplished using a challenge/response protocol. The mail server issues a challenge to which the client computer 101 responds by computing a keyed hash value of the challenge using the user's password. The client system 101 transmits the user's name and the hash value back to the mail server. The mail server then compares the client's hash value with a hash value it computes locally based on the asserted identity of the user. If it matches, the user is authenticated.

In the representative embodiment, if the server 105 has migrated the user's server-side data to a different mail server M0–Mn, the client computer 101 receives a notification that the binding has changed. This notification includes new binding information. The client then establishes a new connection utilizing the new binding information.

After the client is connected to the appropriate mail server and has been authenticated, the client computer 101 transmits the user's member profile stored on storage device 106 to the mail server for that user if appropriate(step 902). The user's member profile will only be transmitted if it has been modified since the last time the client computer 101 transmitted the profile. The creation of the user's member profile was discussed above in connection with FIG. 3.

The client computer 101 also transmits statistical information to the mail server Mn. In the representative embodiment, the statistical information includes, for example (i) which advertisements are shown to the user, for how long and at what times; (ii) whether any advertisement has been altered by the user or corrupted by the system; (iii) the number of remaining exposures for an advertisement; and (iv) when an advertisement is expired for a user or for all users. This information is stored in an advertisement statistics file. The statistical information may also include (i) when a user activates the client program; (ii) how long the client program was used; (iii) when there is a period of inactivity when the client program is running on the client computer, for example, if the user does not enter an instruction for a period of five minutes; (iv) modem configuration problems; (v) information as to how well the client program functioned; (vi) any communication problems with the server system; and (vii) other statistical information useful to predict a user's future behavior with respect to the client program. This information is stored in an event log file.

As appropriate, e-mail messages are communicated between the client computer 101 and the server system 104 (step 904). The client computer 101 receives (and the mail server transmits) new e-mail messages addressed to the user. The client computer 101 stores each new e-mail messages on storage device 106 and associates the new messages with the Inbox folder. The client computer 101 sends (and the mail server receives) e-mail messages created by the user and stored on storage device 106. In the representative embodiment, these messages were associated with the Outbox folder.

Additionally, new banner and showcase advertisements and corresponding scheduling information can be received by the client computer 101 (step 905) from the mail server Mn, and are stored on storage device 106, in, for example, the "ads" subdirectory. Expired advertisements may be overwritten. The scheduling information may include information such as how many times each message should be displayed to each user, what time of day the message should be displayed, how many days the advertisement remains current and eligible for display, etc.

The new banner and showcase advertisements are not correlated in any way to the user's e-mail. In fact, a user may receive the advertisements even if the user does not receive any email or have any e-mail to send.

The client computer 101 may also receive other information from the mail server Mn (step 906). This other information may be, for example, software patches, modem configuration data, and new POP information. The new POP information allows easy changes and additions to the points of presence (usually modem banks and terminal servers) that enable connections between the client computers 101 and the server system 104.

As the client program may occasionally need to be updated to incorporate new features or correct errors (bugs), software patches are also transmitted to the client computer 101. Thus, when a software patch is available, the client computer 101 receives and stores it, and preferably, applies the update sometime in the future.

POP information includes both dialing scripts and telephone numbers.

Finally, after the client computer 101 has transmitted and received all of the necessary information, the client computer 101 is disconnected from the mail server Mn (step 907).

Figure 10:
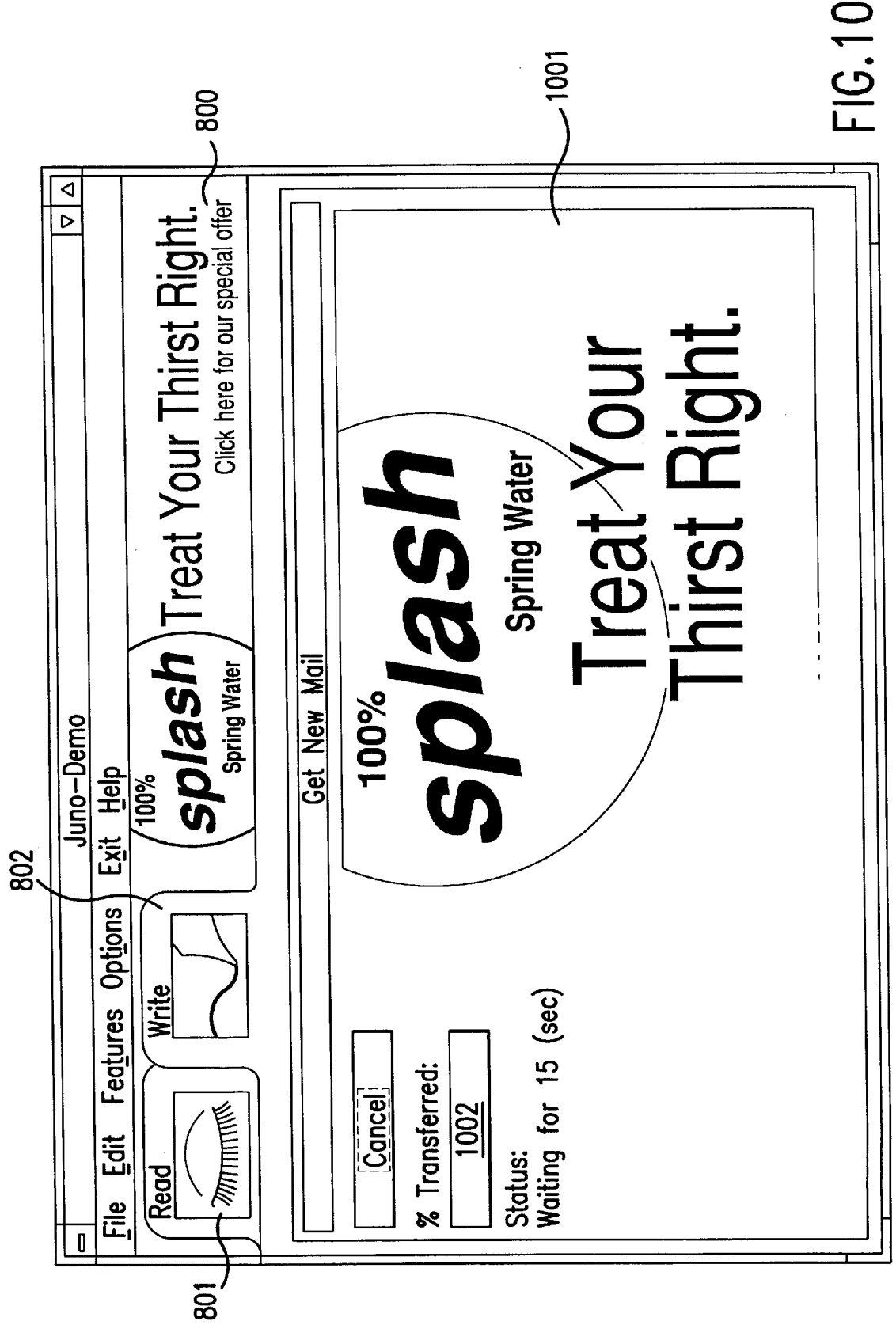
FIG. 10 illustrates an example showcase advertisement.

While the client computer 101 is establishing communications with, and actually communicating with the server system 104 through mail server Mn, showcase advertisements 1001 are displayed to the user. FIG. 10 illustrates a screen display that is shown to the user during steps 901 to 907. Like the banner advertisement 800, the showcase advertisement 1001 can be replaced after a predetermined time, with a different showcase advertisement that is stored on storage device 206. The showcase advertisement 1001 preferably takes up a large portion of the display window as illustrated. The client computer 101 records information such as the identity of the showcase advertisement, the time of the display to the user, and the duration of the display, in the advertisement statistics file, each time a showcase message is displayed.

In an alternate embodiment, a regular or "generic" banner advertisement 800 could be shown concurrently with the showcase advertisements 1001. The generic banner advertisement may, for example, use a limited number of colors, allowing the system to maximize the use of the colors in the showcase advertisements 1001.

To the left of the showcase message 1001, a transfer status 1002 is displayed. This status alerts the user to the percentage of data that has transferred between the client computer 101 and the mail server Mn and what transfer operation is being performed (e.g., modem dialing, modem connecting, transferring, disconnecting, etc.).

Figure 11:
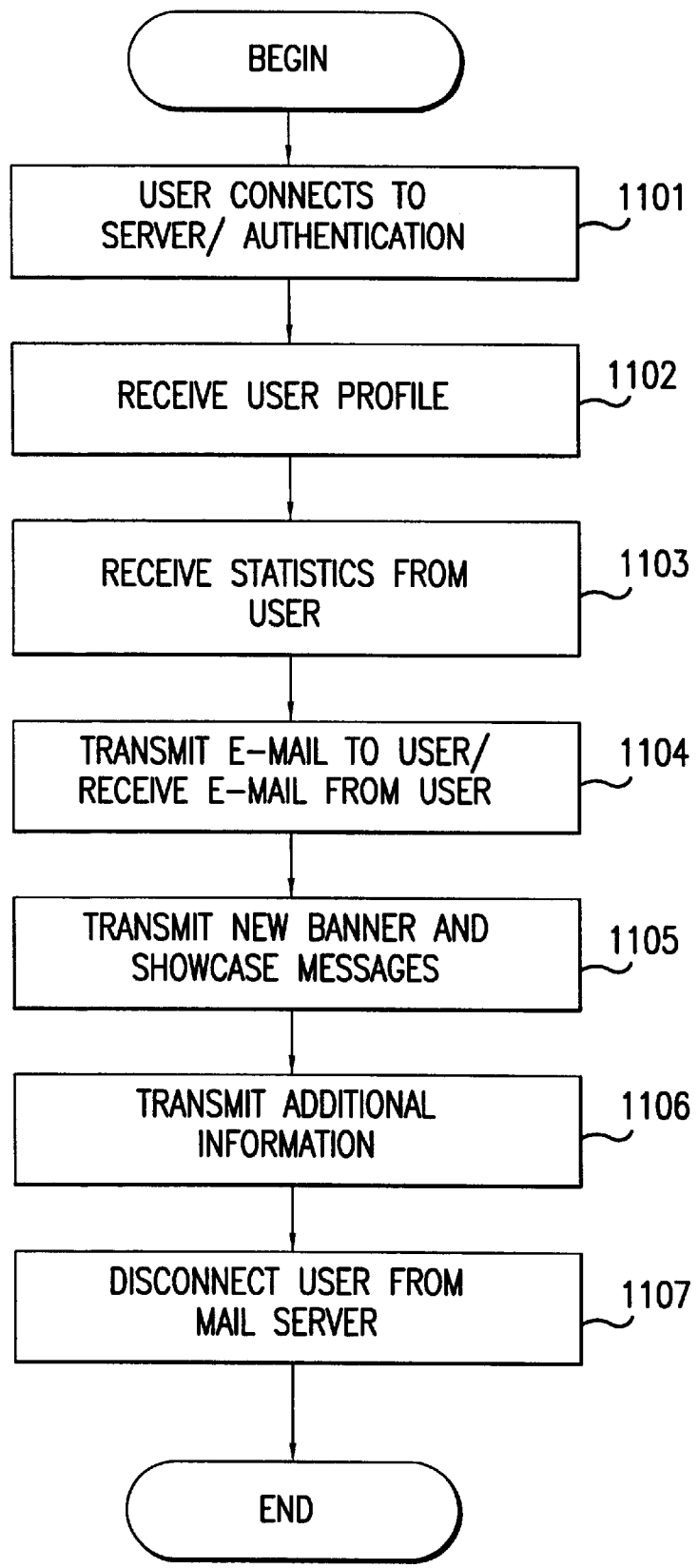
FIG. 11 is a flowchart of the communication process that takes place between the client computer and the server system as performed by the server system.

FIG. 11 illustrates the transfer process of FIG. 9 from the perspective of the server system 104. After the user connects to the appropriate mail server Mn and the user is authenticated (step 1101), and, if necessary, the mail server Mn receives from the client computer 101 the user profile (step 1102). The mail server Mn also receives statistical information from the client computer 101, such as, for example, the event log file and the advertisements statistics file (step 1103). In the representative embodiment, the user profile and the statistical information may be temporarily stored in the mail server Mn. Late at night (off-peak), a batch job may be run to incorporate all the new data into the database management system 106. This information can be used to determine which advertisements are eligible for downloading to a particular user, when the advertisements are to be downloaded, and when the advertisements are to be displayed. The event log file and the advertisement statistics file are also used to create billing information for advocacy groups. After these files are transmitted to the server system 104 by the client computer 101, a backend program at the server system 104 reads and processes these files for reporting and billing advocacy groups whose advertisements have been distributed and/or displayed.

The mail server Mn transmits e-mail messages addressed to the user to that user's client computer 101 and receives e-mail messages from the client computer 101 to be sent to others (step 1104). As indicated above, the e-mail messages addressed to each user are preferably stored at the mail server M0–Mn to which the user is assigned, in this case, mail server Mn.

Thus, to retrieve e-mail messages for a particular user, mail server Mn need only access the files containing the e-mail messages addressed to that user and transmit them to the user. Thus, in the representative embodiment, the mail server Mn does not need to remotely access another machine, thus improving performance and availability by reducing network traffic.

New banner and showcase advertisements are transmitted from the mail server Mn to the user at the client computer 101. When the user connects to mail server Mn, mail server Mn transmits the appropriate advertisements to the user.

In an exemplary embodiment of the present invention, the database management system 106 determines which users are eligible to receive each particular advertisement, and that advertisement will be "placed" in each eligible user's directory on the mail server. When placing an advertisement in the directory, the present invention may place a copy of the advertisement in the directory or create a symbolic link in the directory to a central or common location where the advertisement is stored. This process of determining which users are eligible to receive an advertisement and "placing" the advertisement in the user's directory may take place at an off-peak period such as very late at night.

Where there is more than one user of a particular client computer 101, the advertisements that are eligible to be transferred to all users of that client computer can be stored together on the mail server. Thus, whenever one of those users connects to the mail server, all or a portion of the advertisements for all users of that client computer 101 can be transferred to the client computer 101.

Additional information, such as software patches, new modem configuration data, and new POP data, may be transferred by the server system 104 to the client computer 101 (step 1107).

Once the mail server Mn has finished transmitting and receiving information, the client computer 101 is disconnected from the mail server Mn (step 1108).

Referring again to FIG. 8, the user can click on an "Address Book" button 810. Upon clicking on the "Address Book" button 810, the user is presented with his current list of e-mail addresses (of other system users and non-users) that the user has stored, e.g., on storage device 206. The user may add other e-mail addresses to this electronic "address book."

Figure 12:
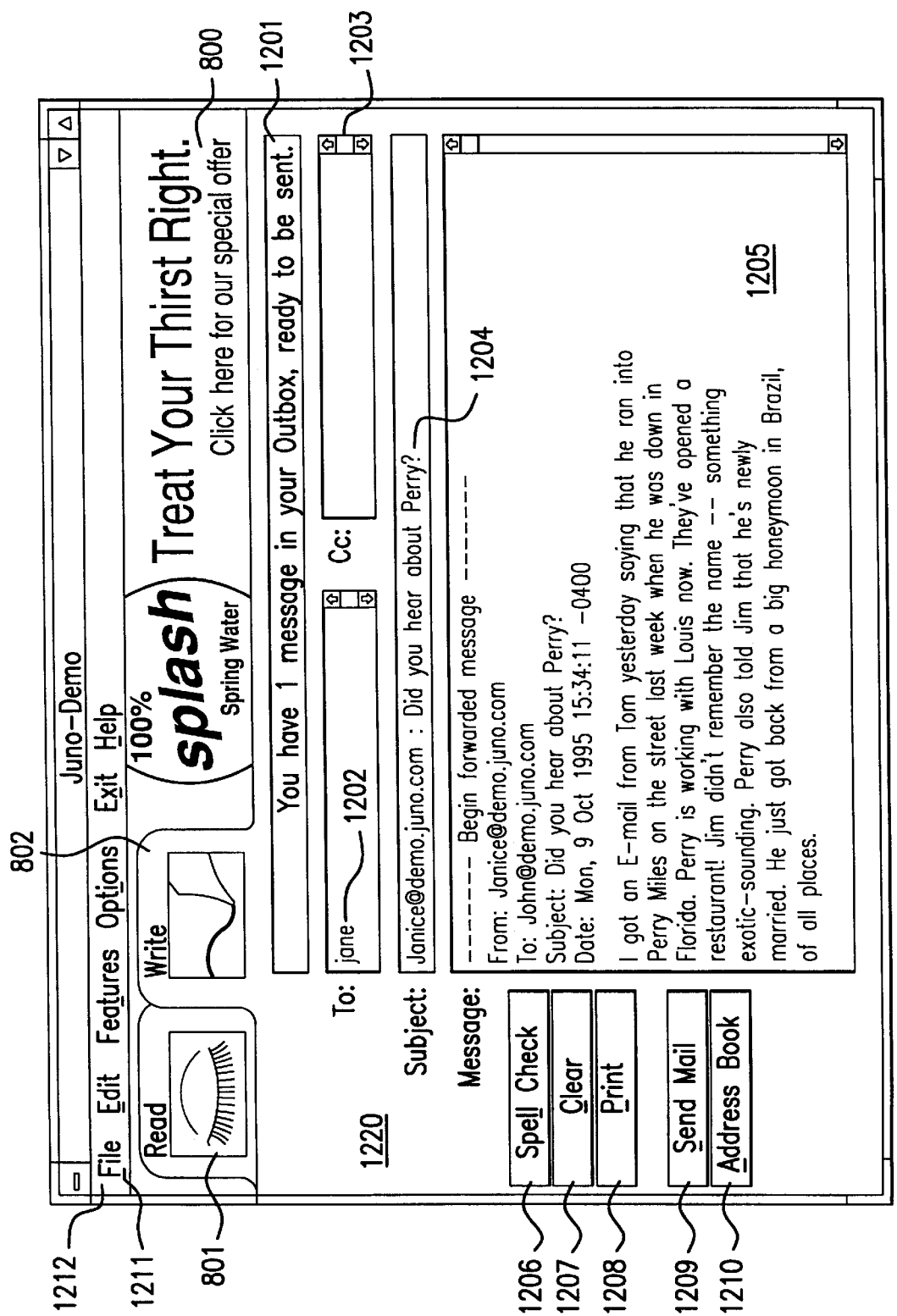
FIG. 12 illustrates an example write screen used to create e-mail messages.

If the user wishes to compose an e-mail message, the user can select the write tab 802 (step 505), causing the write screen 1220 to be displayed, as shown in FIG. 12 (step 506). The write screen 1220 presents the user with a blank e-mail message template 1201 which the user can complete, as well as several GUI buttons: a "Spell Check" button 1206, a "Clear" button 1207, a "Print" button 1208, a "Send Mail" button 1209, and an "Address Book" button 1210.

As illustrated, the e-mail message template 1201 includes a "To:" field into which the user can enter e-mail addressees. In this case, only one e-mail addressee has been entered, "jane@demo.com," however, several different e-mail addressees could have been entered.

The e-mail template 1201 also includes a "Cc:" field 1203 for entering the e-mail addresses of users who should receive a copy of the e-mail the user is sending. Here, "janice@demo.com" is entered in the "Cc:" field 1203.

Additionally, a "Subject:" field 1204 is provided for entering information preferably identifying the subject of the e-mail message. "Perry" is the subject of the e-mail message illustrated.

Finally a "Message:" field 1205 is provided. This is the portion of the e-mail template 1201 where the user can write a message, i.e., fill in the message body.

Once the e-mail template 1201 has been completed, the user can click on the "Spell Check" button which provides checks of the spelling of information in the "Message:" field 1205.

Clicking on the "Clear:" button 1207 provides the function of clearing the e-mail message template 1201 so that the user can rapidly clear the fields of the e-mail message template.

The "Print" button 1208, when selected, causes the client computer 101 to print the e-mail template 1201, with the information entered, to a printer that is coupled to the client computer 101.

If the user decides that the e-mail message is complete, the user may select the "Send Mail" button 1209. In response, the client computer 101 asks the user whether the user wants to move the message to an "outbox" folder or whether the user wants to send (and receive) e-mail messages immediately. A user will generally elect to move the message to an "outbox" folder if the user intends to write more e-mail messages during the current session. As described earlier, the "outbox" folder is preferably for temporary storage of outgoing e-mail messages that are waiting to be sent. If the user does elect to move the message to the "outbox" folder, the message is stored on the storage device 206 of the client computer 101, and the user is again presented with a blank e-mail template.

If instead, the user elects to send and receive e-mail immediately, the processes described in connection with FIGS. 9 and 11 are performed. E-mail messages stored in the user's "outbox" folder as well as the current new e-mail message are transmitted by the client computer 101 to the mail server Mn for delivery.

If the addressees of the e-mail transmitted are users of the present invention, the e-mail will be delivered to the addressees the next time they connect to a mail server M0–Mn. Otherwise, the mail server Mn will transmit the e-mail message outside the present system, for example, over the Internet 107.

Finally, clicking on the "Address Book" 1210 results in the display of the user's current list of e-mail addresses (of other system users and non-users) that he has stored on storage device 206. Using the electronic "address book," the user can look up the address of someone to whom the user wishes to send an e-mail message. The user may also add other e-mail addresses to the electronic address book.

When creating e-mail messages in the write screen 1220, banner advertisements 800 are displayed to the user. The client computer 101 is not connected to the server system 104 when the user is creating e-mail messages.

When the user has completed all e-mail processing, the user can exit the client program by selecting "File" 1211 positioned in a menu bar 1212 and then selecting "Exit" from a drop down menu (step 507).

More than one user may use a single client computer 101. In such case, a subdirectory is provided for each user on the client computer 101, e.g., user0, user1, etc. However, there need be only one "ads" directory storing advertisements. These advertisements may be eligible for display to all, some or one only of the users. In the representative embodiment, each advertisement contains scheduling information for each user to whom the advertisement will be shown. In addition, a list of known advertisements for each user is maintained on the client computer 101. This list is modified by an advertisement scheduler and advertisement spooler both of which run locally on the client computer 101. The advertisement scheduler removes an advertisement from a user's list when the advertisement expires. The advertisement spooler makes additions to the per-user data structures when a new advertisement is received.

Figure 6:
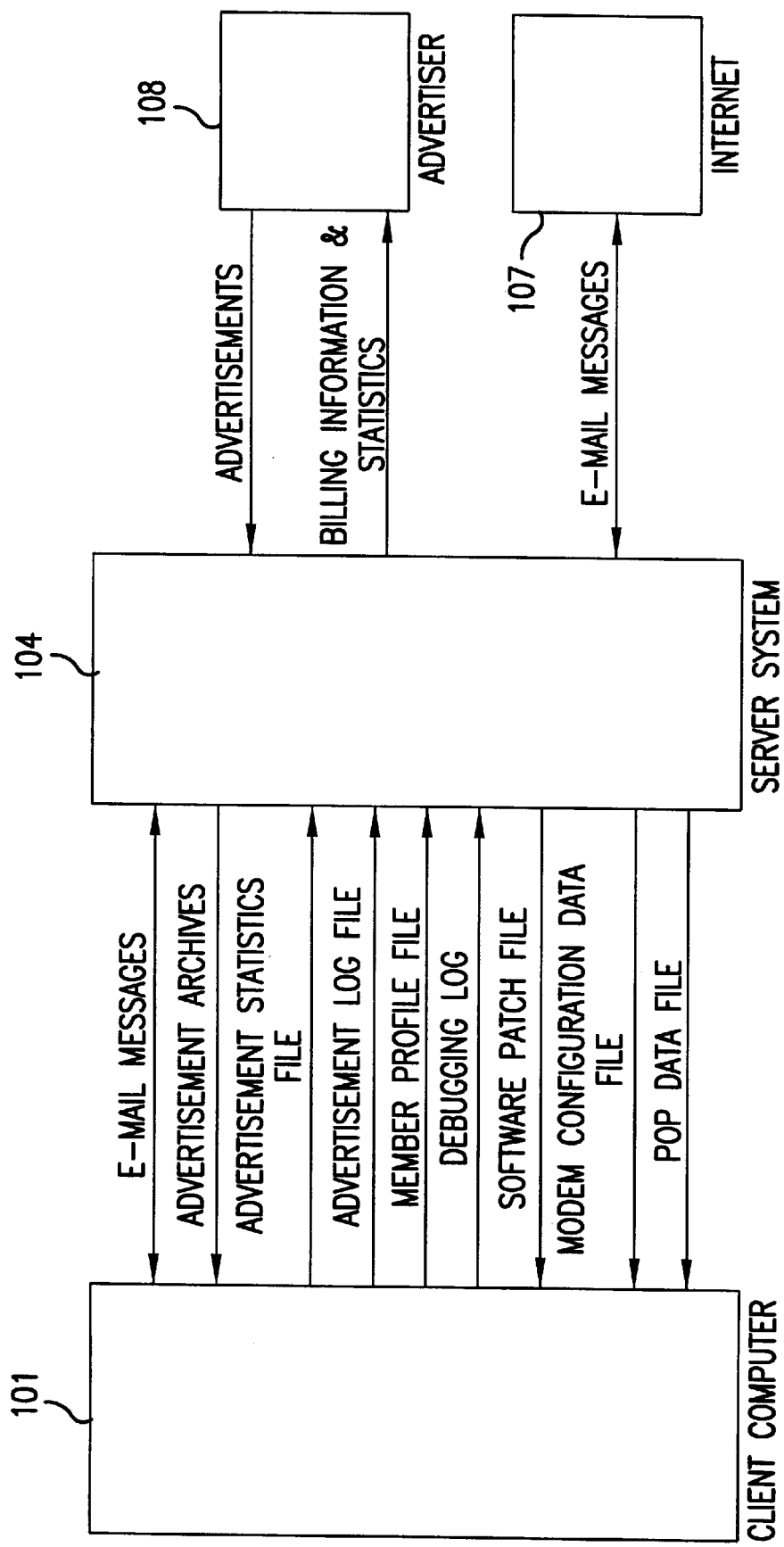
FIG. 6 illustrates information communicated between the client computer and the server system.

FIG. 6 summarizes the information that is communicated between the client computer 101 and the server system 104 of the representative embodiment of the present invention. E-mail messages are compressed for transmission. Advertisement archives are transferred from the server system 104 to the client computer 101. Each advertisement archive comprises a combination of advertisement data (as discussed above with reference to the PDL) and advertisement control information. Advertisement control information includes scheduling information for that advertisement, e.g., show the advertisement twenty times, but only for the next ten days. The advertisement archive is stored in compressed format at the server system 104. (For convenience only, this specification sometimes refers to transmission of an advertisement from the server system 104 to a client computer 101. In the representative embodiment, it is an advertisement archive, not actually an advertisement, that is transmitted.)

An advertisement statistics file and an event log file are compressed prior to transmission and sent from the client computer 101 to the server system 104. A member profile file, storing information about the user, is sent for the client computer 101 to the server system 104. In the representative embodiment, this file is in a Windows INI format, and is compressed for transmission. A file comprising a debugging log is also transmitted, in compressed form, from the client computer 101 to the server system 104.

The following files are sent from the server system 104 to the client computer 101: a binary data file comprising a software patch, compressed prior to transmission; a file comprising modem configuration and identification data used by modem configuration software at the client computer 101, compressed prior to transmission; and a file of POP data, including dial scripts and telephone numbers referring to points of presence, compressed prior to transmission.

FIG. 6 also illustrates the information that is communicated between the server system 104 and an advocacy group or "advertiser" 108. In particular, files containing advertisement information may be communicated from the advocacy group 108 to the server system 104 for processing and storage in database management system 106. Also, billing information and statistics may be communicated to the advocacy group 108 from the server system 104. The advertisements, billing information, and statistics may be electronically communicated between the server system 104 and the advocacy group 108, directly or indirectly, over a network, over the air waves, or over any other communication media. Alternatively, the information may simply be hand delivered on a storage media such as tape or disk.

Although FIG. 6 shows only one advocacy group 108, it will be appreciated that the representative embodiment of the present invention can include many advocacy groups.

Also illustrated in FIG. 6 is the flow of information between the server system 104 and an external network such as the Internet 107. As described above, the server system may transmit information such as e-mail messages to and from non-users of the server system 104 via the external network 107.

As can be appreciated, the present invention operates in an efficient manner. In particular, the user at the client computer 101 operates locally while composing and reading email messages. Only when the user is ready to transmit or receive new e-mail messages does the client computer 101 establish a communications link with the server system 104, and the client computer 101 is disconnected as soon as all information is transmitted and received. Thus, the system operates in a "batch" mode. This, of course, keeps the costs associated with maintaining a communications link, i.e., connect or line charges, low.

Further, the present invention maximizes potential advertising time by displaying messages to a user at a client computer 101 even when the client computer 101 is "off-line" from the server system 104.

It will be appreciated that the principles of the present invention could be used to provide advertisements to users in on-line systems other than e-mail systems. For example, the present invention could be adapted to output a series of advertisements to users in a system that allowed downloading of a number of web pages for off-line browsing. In general, the present invention could be utilized wherever digital content is downloaded to a user for off-line access.

E-mail Advocacy Network

As briefly described above in the background of the invention, in some cases an advocacy group may want a number of people to contact a particular representative. As used herein, the term "representative" can include a specific person, a group of people or an office. That is, the representative may be, for example, an elected official, such as a member of the United States Senate or House of Representatives, or a locally elected official. The representative may also be, for example, a government agency, a quasi-governmental agency, firm or organization, or any entity that is targeted by an advocacy group. The advocacy group may, for example, encourage a number of people contact a particular congressman about an upcoming vote.

Figure 13:
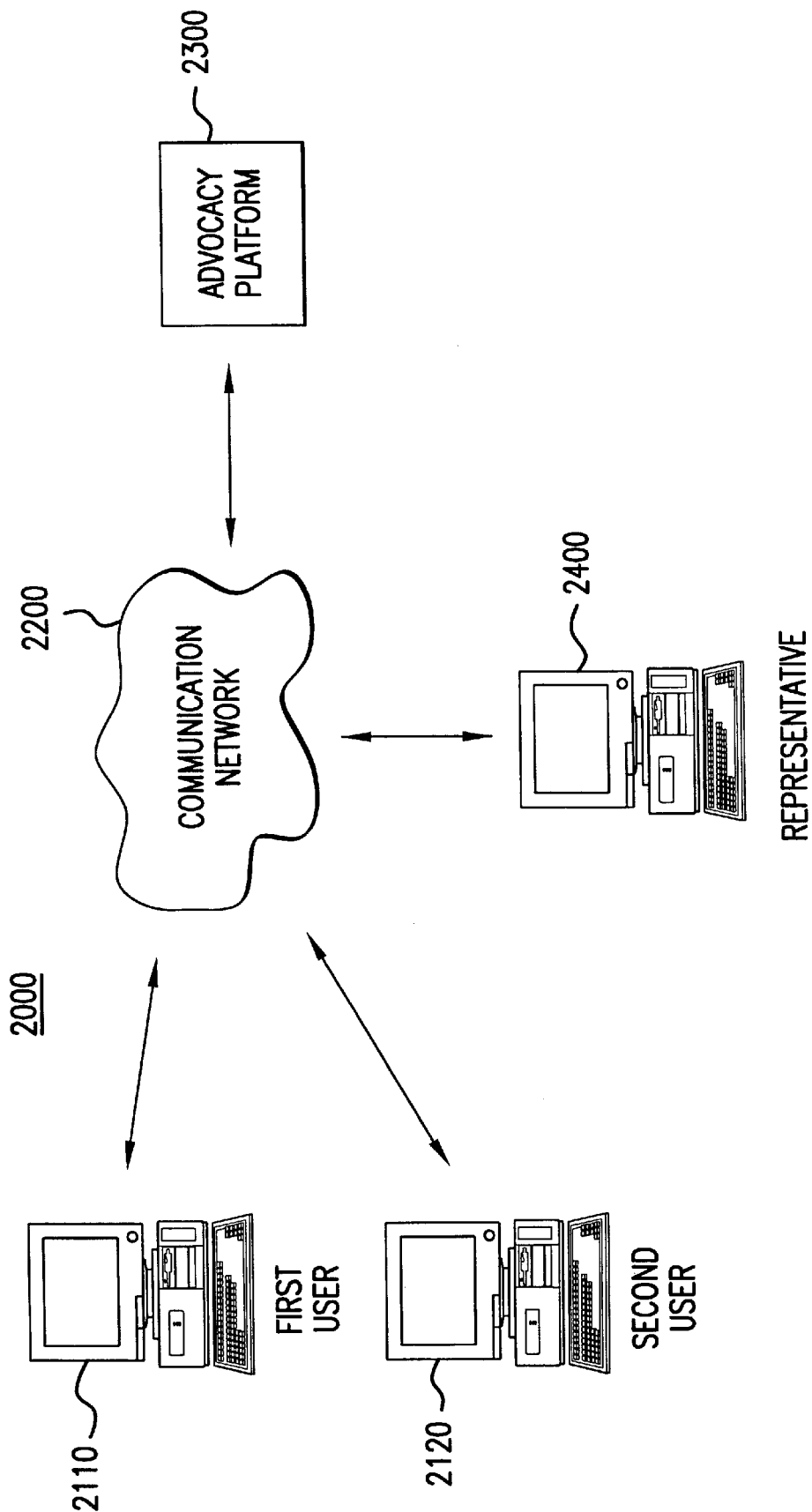
FIG. 13 is a system diagram of an advocacy network according to an embodiment of the present invention.

According to an embodiment of the present invention, an advocacy network, such as the system described with respect to FIGS. 1–12, is used for this purpose. As shown in FIG. 13, the advocacy network 2000 includes a number of users, such as a first user 2110 and a second user 2120 that communicate with an advocacy platform 2300 through a communication network 2200. The Internet and Public Switched Telephone Network (PSTN) are examples of such a communication network 2200, but any network capable of carrying the communications described below can be used instead. The advocacy platform 2300 also communicates with a representative 2400, such as through the communication network 2200.

According to an embodiment of the present invention, the advocacy platform 2300 sends an advocacy message, such as the advocacy message 2500 shown in FIG. 15, to a number of users 2110, 2120 through an e-mail system as described above with respect to FIGS. 1–12. If desired, the advocacy platform 2300 can send the advocacy message to a subset of the e-mail system users. For example, only users living in a certain state, or within a certain geographic area or ZIP code area, having certain demographic or psychographic characteristics, may be contacted. As will be explained, this process may be automatically performed by the advocacy network 2000, such as, for example, by being performed without human intervention.

The advocacy message may explain, for example, the issues involved in an upcoming vote. If desired, the advocacy message can be tailored to a particular user, such as by including the name of the user's representative. This information may be automatically determined based on information stored about the user in a database. That is, the user may not need to provide this information to the advocacy network 2000 in response to an advocacy message. FIG. 17 is another example of such an advocacy advertisement.

The advocacy message may also ask the user to "click on" a button if the user would like to automatically send an e-mail to his or her representative. As is also described above with respect to FIGS. 1–12, an "indication" as to whether or not the user clicked on this button can be returned to the advocacy platform 2300 in an event file. For example, a hotspot 2510 in the advocacy message may cause an event to be logged indicating that the user would like to automatically send an e-mail to his or her representative.

The advocacy message may contain the exact text of an e-mail message, and not let users change the e-mail message. Alternatively, the advocacy message may instead let users create their own e-mail messages. As another alternative, the advocacy message may have a "default" e-mail message that can be modified by users.

Figure 18:
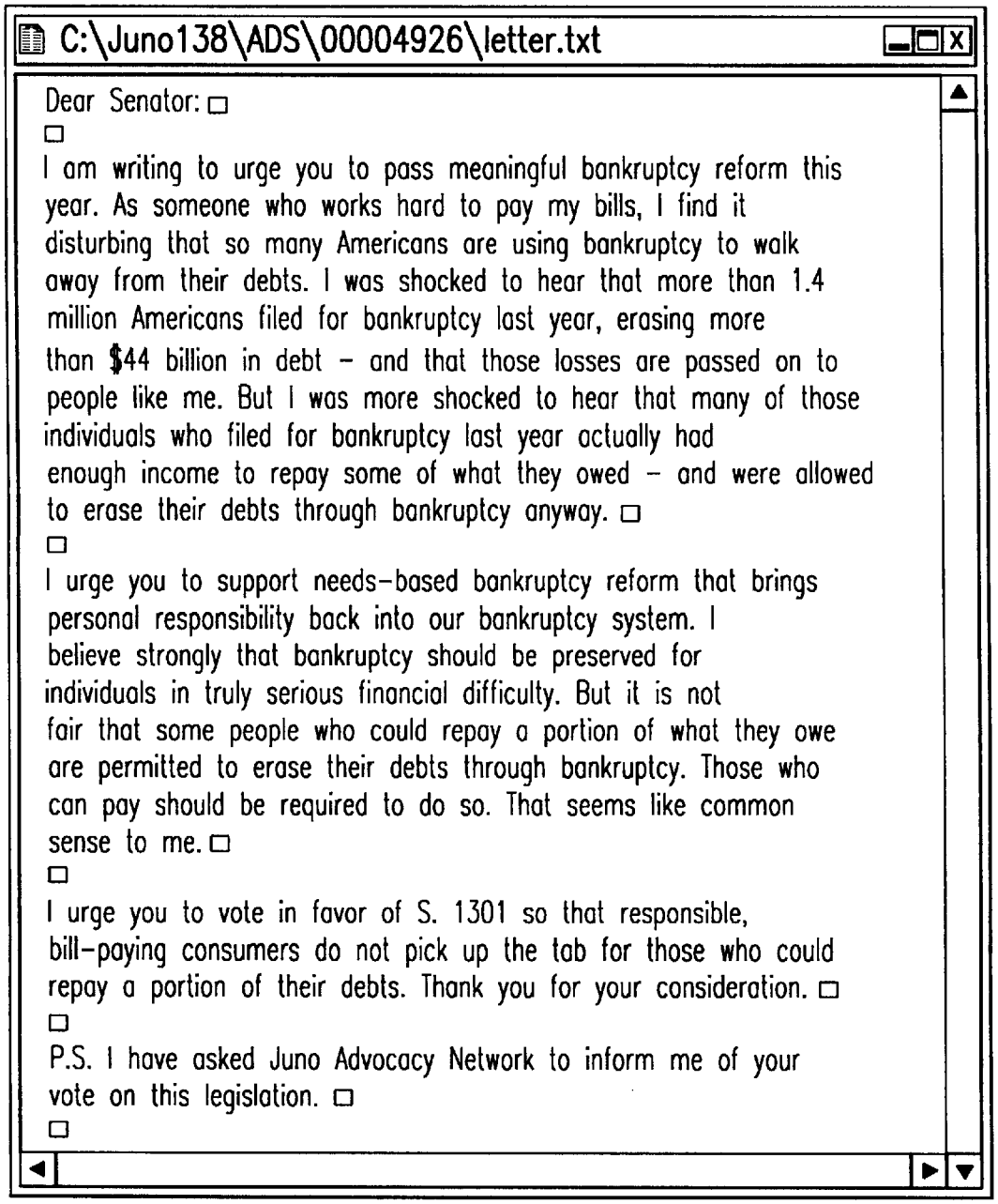
FIG. 18 is another example of an advocacy e-mail message.

Based on the event file, the advocacy platform 2300 may automatically generate and send an appropriate e-mail message to the representative 2400, such as the e-mail message 2600 shown in FIG. 16. Note that FIG. 16 may include, for example, a representative's name, the sender's name and home address, and customized information based on demographic information about the sender ("[a]s a mother . . . "). FIG. 18 is another example of an advocacy email message.

The advocacy platform 2300 may do this immediately or in small batches (such as batches of eight times per day). According to another embodiment of the present invention, the advocacy platform 2300 may wait and send a large batch of e-mail messages at a particular time, such as the day before a vote. The e-mail message will preferably be "signed" with the user's name and home address (as opposed to only an e-mail address), because many representatives are not interested in anonymous opinions or opinions of people who live outside a particular voting district. The "signing" may be done automatically without requiring user input. Of course, for privacy reasons, such signing may be performed when then user has specifically authorized such an action, such as by clicking on a particular button.

According to another embodiment of the present invention, information about the representative, such as the representative's name and office and/or a message specifically tailored to evoke an appropriate response, may also be automatically included in the e-mail message sent on behalf of the user. Furthermore, the contents of the e-mail message sent to one or more representatives may itself be customized in several ways. It might contain a fixed message to which the user's name and address is appended. Alternatively, the contents of the message itself may be customized based on the user's demographic and psychographic profile or on the input supplied by the user in the response to the advocacy message.

If desired, the advocacy platform 2300 may also send a "cc:" of the message, including contact information such as the user's name, phone number, home address or e-mail address, to the advocacy group. A list of such information may be helpful, for example, if the advocacy group would like to contact users that sent messages about a particular issue or to raise funds. Such a list may also be used to tangibly demonstrate how many users have contacted a representative.

Figure 14:
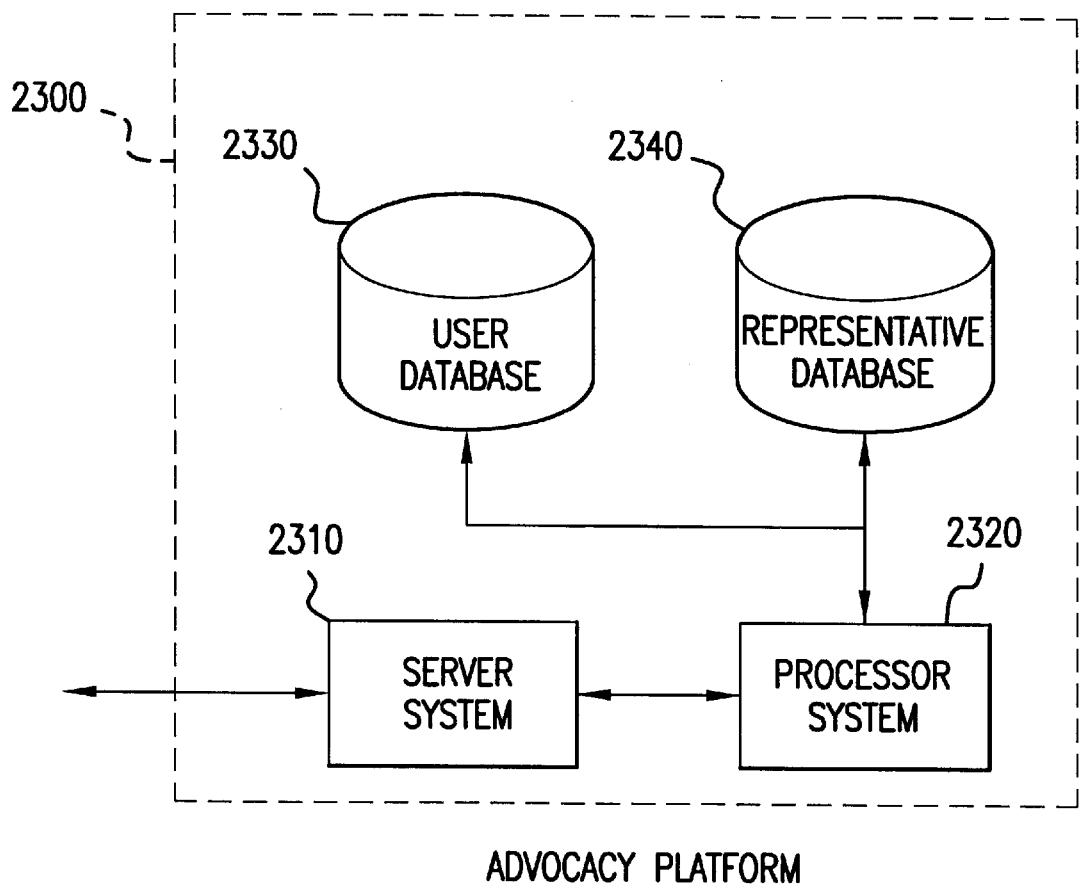
FIG. 14 is a more detailed view of the advocacy platform shown in FIG. 13.

FIG. 14 is a more detailed view of the advocacy platform 2300 shown in FIG. 13. The advocacy platform 2300 includes a server system 2310 to handle the (i) sending of e-mail messages and an advocacy message to users; (ii) receiving event files, including an indication, from users and (iii) sending e-mail messages to one or more representatives.

When an advocacy group decides to use the advocacy network 2000, a processor system 2320 determines which users will receive the message. For example, the processor system 2320 may select:

all of the e-mail system users;

users that in California's 3rd Congressional District;

users with children under the age of ten;

users with particular hobbies or interests; or female users between the ages 18 and 25.

Of course, any combination of, for example, geographic, demographic and psychographic criteria can be used, if desired. The processor system 2320 may select users based on, for example, zip codes contained in a user database 2330. The processor system 2320 may also utilize a representative database 2340 to select users based on, for example, which zip codes are in a particular congressional district or which representatives are on a particular committee. This allows automated targeting of users and/or representatives because all of the information required to make such determinations may be available in the user database 2330 and the representative database 2340. Moreover, the processor system 2320 may also access third party databases, such as, for example, public records, including motor vehicle and voter registration databases.

If desired, the advocacy network 2000 may also send a follow-up message to the users 2110, 2120 such as a message stating the outcome of a particular vote, or how a particular representative voted. The advocacy network 2000 may also be configured to generate reports for the advocacy group, such as reports indicating what percentage of users responded to an advocacy message. Such reports may also catagorize this information in terms of the user's geographic, demographic and psychographic characteristics.

According to another embodiment of the present invention, the advocacy platform 2300 may be configured to send a message other than an e-mail message to the representative 2400. For example, the advocacy platform 2300 may be configured to send a facsimile, telephone or written and mailed message to the representative 2400. In the case of a telephone message, the advocacy platform 2300 may cause another platform to dial both a user and a representative and then connect the two parties. According to another embodiment of the present invention, the advocacy platform may directly dial both a user and a representative and connect the two parties.

An advocacy message may also, if desired, collect responses to one or more survey questions from a number of users. For example, the advocacy message may contain a list of questions related to an advocacy issue. The user may provide answers to each of the questions (such as by clicking on a selection or entering information), which may then be included in the event file sent back to the server system. Such information may be used to update a user database, forwarded to the advocacy group (perhaps along with contact information related to the user) and/or used to automatically select further messages for that user. The idea of collecting survey information may also be used to gather contact information, such as user names, phone numbers, home addresses and e-mail address, similar to using a "cc:" message as described above with respect to the advocacy platform 2300.

While the present invention has been particularly shown and described with reference to preferred embodiments thereof, it will be understood by those skilled in the art that various changes in form and details may be made therein without departing from the spirit and scope of the invention.

What is claimed is:

1. A method of operating an advocacy network, comprising the steps of:

accessing a user database, the user database comprising information about users and information identifying a representative associated with each user;

automatically selecting a user based on information in the user database; and sending an advocacy message to the selected user through a first communication network.

2. The method of claim 1, wherein the advocacy message includes a portion allowing the selected user to generate an indication, and further comprising the steps of:

receiving the indication from the selected user; and sending a response message to the representative associated with the selected user, including information about the selected user, based on the received indication.

3. The method of claim 2, wherein the response message is sent through a second communication network.

4. The method of claim 3, wherein one of the first and second communication networks comprise one of the Internet and a Public Switched Telephone Network.

5. The method of claim 2, wherein the information about the selected user sent in the response message comprises a home address of the selected user.

6. The method of claim 2, wherein the response message comprises one of an e-mail message, a facsimile message, a printed letter and a telephone call.

7. The method of claim 2, wherein said response message is sent at a pre-determined time along with response messages associated with other users.

8. The method of claim 2, wherein the response message comprises a telephone call and comprising the further steps of:

placing a telephone call to a first telephone number associated with the selected user;

placing a telephone call to a second telephone number associated with the representative associated with the selected user; and connecting the selected user with the representative associated with the selected user.

9. The method of claim 2, wherein the response message comprises one of: pre-determined response message that cannot be altered by the selected user; a pre-determined response message that can be altered by the selected user; and a user generated response message.

10. The method of claim 2, comprising the further step of:

sending a follow-up message to the selected user.

11. The method of claim 2, comprising the further step of:

generating a report, including information about the indication, for an advocacy group.

12. The method of claim 1, comprising the further steps of:

asking the selected user for permission to provide contact information to an advocacy party; and automatically providing contact information associated with the selected user to the advocacy party.

13. The method of claim 1, wherein the advocacy message includes at least one survey question, and comprising the further steps of:

receiving an answer to the survey question from the selected user; and compiling a plurality of received answers from a plurality of selected users.

14. The method of claim 1, wherein the information about users comprises at least one of geographic, demographic and psychographic information.

15. The method of claim 1, wherein each representative is associated with a geographic area and the information identifying the elected representative comprises information associated with a home address of the selected user.

16. The method of claim 1, wherein said step of selecting comprises automatically selecting a user based on both the information about users and the information identifying a representative associated with each user.

17. The method of claim 1, wherein the advocacy message comprises a message associated with an e-mail system.

18. The method of claim 1, wherein the advocacy message is sent to the selected user through a first communication network and is displayed to the selected user when the selected user is off-line with respect to the first communication network.

19. The method of claim 1, wherein the advocacy message comprises at least one of a text, an audio, a graphical and a multimedia message.

20. The method of claim 1, wherein said step of selecting automatically selects a plurality of users form the user database.

21. The method of claim 1, wherein said step of selecting is performed by one of (1) comparing information a user with information about a plurality of representatives and; and (2) comparing information about a representative with information about a plurality of users.

22. The method of claim 1, wherein the advocacy messages contains information associated with the representative.

23. An apparatus for using an advocacy network, comprising:
a user database configured to store information about users and information identifying a representative associated with each user;
a processor coupled to said user database, said processor being configured to (a) access the user database, (b) select a user based on information in the user database and (c) generate an advocacy message to the selected user; and
a communications interface coupled to said processor and configured to send the generated advocacy message through a communication network.

24. The apparatus of claim 23, wherein the advocacy message includes a portion allowing the selected user to generate an indication, and wherein said processor is further configured to receive the indication from the selected user and send a response message to the representative associated with the selected user, including information about the selected user, based on the received indication.

25. The apparatus of claim 24, wherein the information about the selected user sent in the response message comprises a home address of the selected user.

26. The apparatus of claim 24, wherein the response message comprises one of an e-mail message, a facsimile message, a printed letter and a telephone call.

27. The apparatus of claim 24, wherein the response message is sent at a pre-determined time along with response messages associated with other users.

28. The apparatus of claim 24, wherein the response message comprises a telephone call automatically established between the representative and the selected user.

29. The apparatus of claim 23, wherein the information about users comprises at least one of geographic, demographic and psychographic information.

30. The apparatus of claim 23, wherein each representative is associated with a geographic area and the information identifying the elected representative comprises information associated with a home address of the selected user.

31. The apparatus of claim 23, wherein said processor is further configured to automatically select a user based on both the information about users and the information identifying a representative associated with each user.

32. The apparatus of claim 23, wherein the advocacy message comprises a message associated with an e-mail system.

33. The apparatus of claim 23, wherein the advocacy message is sent to the selected user through a first communication network and is displayed to the selected user when the selected user is off-line with respect to the first communication network.

34. The apparatus of claim 23, wherein the advocacy message comprises at least one of a text, an audio, a graphical and a multimedia message.

35. The apparatus of claim 23, wherein the advocacy messages contains information associated with the representative.

36. An apparatus for using an advocacy network, comprising:
means for accessing a user database, the user database comprising information about users and information identifying a representative associated with each user;
means for automatically selecting a user based on information in the user database; and
means for sending an advocacy message to the selected user through a first communication network.

37. The apparatus of claim 36, wherein the advocacy message includes a portion allowing the selected user to generate an indication, and wherein said processor is further configured to receive the indication from the selected user and send a response message to the representative associated with the selected user, including information about the selected user, based on the received indication.

38. The apparatus of claim 37, wherein the information about the selected user sent in the response message comprises a home address of the selected user.

39. The apparatus of claim 37, wherein the response message comprises one of an e-mail message, a facsimile message, a printed letter and a telephone call.

40. The apparatus of claim 37, wherein the response message is sent at a pre-determined time along with response messages associated with other users.

41. The apparatus of claim 37, wherein the response message comprises a telephone call automatically established between the representative and the selected user.

42. The apparatus of claim 36, wherein the advocacy messages contains information associated with the representative.

43. The apparatus of claim 36, wherein each representative is associated with a geographic area and the information identifying the elected representative comprises information associated with a home address of the selected user.

44. The apparatus of claim 43, wherein said means for selecting is further configured to automatically select a user based on both the information about users and the information identifying a representative associated with each user.

45. The apparatus of claim 36, wherein the information about users comprises at least one of geographic, demographic and psychographic information.

46. The apparatus of claim 36, wherein the advocacy message comprises a message associated with an e-mail system.

47. The apparatus of claim 36, wherein the advocacy message is sent to the selected user through a first communication network and is displayed to the selected user when the selected user is off-line with respect to the first communication network.

48. The apparatus of claim 36, wherein the advocacy message comprises at least one of a text, an audio, a graphical and a multimedia message.

49. An article of manufacture comprising a computer-readable medium having stored thereon instructions adapted to be executed by a processor, the instructions which, when executed, define a series of steps for using an advocacy network, said steps comprising:

accessing a user database, the user database comprising information about users and information identifying a representative associated with each user;

automatically selecting a user based on information in the user database; and sending an advocacy message to the selected user through a first communication network.

50. The article of manufacture of claim 49, wherein the advocacy message includes a portion allowing the selected user to generate an indication, and wherein said processor is further configured to receive the indication from the selected user and send a response message to the representative associated with the selected user, including information about the selected user, based on the received indication.

51. The article of manufacture of claim 50, wherein the information about the selected user sent in the response message comprises a home address of the selected user.

52. The article of manufacture of claim 50, wherein the response message comprises one of an e-mail message, a facsimile message, a printed letter and a telephone call.

53. The article of manufacture of claim 50, wherein the response message is sent at a pre-determined time along with response messages associated with other users.

54. The article of manufacture of claim 50, wherein the response message comprises a telephone call automatically established between the representative and the selected user.

55. The article of manufacture of claim 49, wherein each representative is associated with a geographic area and the information identifying the elected representative comprises information associated with a home address of the selected user.

56. The article of manufacture of claim 55, wherein said means for selecting is further configured to automatically select a user based on both the information about users and the information identifying a representative associated with each user.

57. The article of manufacture of claim 49, wherein the information about users comprises at least one of geographic, demographic and psychographic information.

58. The article of manufacture of claim 49, wherein the advocacy message comprises a message associated with an e-mail system.

59. The article of manufacture of claim 49, wherein the advocacy message is sent to the selected user through a first communication network and is displayed to the selected user when the selected user is off-line with respect to the first communication network.

60. The article of manufacture of claim 49, wherein the advocacy message comprises at least one of a text, an audio, a graphical and a multimedia message.

61. The article of manufacture of claim 49, wherein the advocacy messages contains information associated with the representative.

62. A method of operating an advocacy network, comprising the steps of:

sending an advocacy message to a user, including a portion allowing the user to generate an indication, through a first communication network;

receiving the indication from the user; and sending, based on the received indication, a response message to a representative associated with the user, the response message including information about the user.

63. A method of operating an advocacy network, comprising the steps of:

accessing a user database, the user database comprising a home address associated with each user and information identifying a representative associated with each user;

automatically selecting a user based on both the information about the selected user and the information identifying a representative associated with the selected user;

sending an advocacy message to the selected user, advocacy message being associated with an e-mail and including a portion allowing the selected user to generate an indication;

receiving the indication from the selected user; and automatically sending a response message to the representative associated with the selected user, including the home address of the selected user, based on the received indication.

* * * * *